US012700705B2

(12) United States Patent
Ho

(10) Patent No.: US 12,700,705 B2
(45) Date of Patent: Aug. 4, 2026

(54) ELECTRICAL CONNECTION DEVICE

(71) Applicant: MOLEX, LLC, Lisle, IL (US)

(72) Inventor: Yi-Tse Ho, New Taipei City (TW)

(73) Assignee: Molex, LLC, Lisle, IL (US)

( * ) Notice: Subject to any disclaimer, the term of this patent is extended or adjusted under 35 U.S.C. 154(b) by 434 days.

(21) Appl. No.: 18/404,906

(22) Filed: Jan. 5, 2024

(65) Prior Publication Data

US 2024/0243535 A1 Jul. 18, 2024

(30) Foreign Application Priority Data

Jan. 13, 2023 (CN) ......................... 202310066383.1

(51) Int. Cl.
*H01R 31/06* (2006.01)
*H01R 13/631* (2006.01)
*H01R 25/16* (2006.01)

(52) U.S. Cl.
CPC ......... *H01R 31/06* (2013.01); *H01R 13/6315* (2013.01); *H01R 25/162* (2013.01)

(58) Field of Classification Search
CPC ............ H01R 13/2492; H01R 13/6315; H01R 13/113; H01R 25/162; H01R 31/06; H05K 7/147; H05K 7/1492; G06F 1/189
See application file for complete search history.

(56) References Cited

U.S. PATENT DOCUMENTS 4,460,239 A * 7/1984 Inoue .................. H01R 13/113 439/786
9,680,236 B2 * 6/2017 Ngo ......................... H01R 4/48
10,404,041 B2 9/2019 Huang
10,431,945 B1 * 10/2019 Baechtle ............ H01R 13/4538
10,790,643 B2 9/2020 Velthuis
11,329,410 B2 * 5/2022 He ..................... H01R 12/7088
2014/0080339 A1 * 3/2014 Ebisawa .............. H01R 13/514 439/212
2019/0089093 A1 * 3/2019 Liu .................... H01R 12/7088
(Continued)

FOREIGN PATENT DOCUMENTS

CN 108346869 B 7/2020
CN 211743581 U 10/2020
CN 213026920 U 4/2021
(Continued)

*Primary Examiner* — Christopher M Koehler
*Assistant Examiner* — Gregory L Mangot

(57) ABSTRACT

An electrical connection device e includes a busbar group, a rack busbar group and an adapter. The busbar group includes a first busbar and a second busbar, the first busbar has a first body and a first transmitting portion. The second busbar has a second body and a second transmitting portion. The second body and the first body are constructed therebetween to be insulated from each other and be not conducted with each other. The rack busbar group includes two rack busbars. The adapter pluggably mates with the first transmitting portion and the second transmitting portion of the busbar group and is configured so that the adapter is capable of floating relative to the busbar group along a left-right direction, the adapter further pluggably mates with the two rack busbars of the rack busbar group and is configured so that the adapter is capable of floating relative to the rack busbar group along an up-down direction.

21 Claims, 20 Drawing Sheets

(56) References Cited

U.S. PATENT DOCUMENTS

| | | | | |
|---|---|---|---|---|
| 2020/0169029 | A1 | 5/2020 | Sun | |
| 2024/0154375 | A1* | 5/2024 | Yin | H01R 25/162 |

FOREIGN PATENT DOCUMENTS

| | | | |
|---|---|---|---|
| TW | M624652 | U | 3/2022 |
| TW | I769307 | B | 7/2022 |
| WO | 2005031937 | A1 | 4/2005 |

* cited by examiner

ELECTRICAL CONNECTION DEVICE

RELATED APPLICATION

The present application claims priority to Chinese patent application no. 202310066383.1 filed on Jan. 13, 2023, which is incorporated by reference in its entirety.

TECHNICAL FIELD

The present disclosure relates to an electrical connection device, and particularly relates to an electrical connection device which is floatingly pluggable.

BACKGROUND

Chinese patent document CN109426326A discloses a busbar group which includes a first connecting busbar and a second connecting busbar. A first outputting portion of the first connecting busbar includes a plurality of first holes, a second outputting portion of the second connecting busbar includes a plurality of second holes, the plurality of first holes and the plurality of second holes correspond to each other. The plurality of first holes and the plurality of second holes are configured to allow a rack busbar of a server rack to be fixed in a gap between the first outputting portion and the second outputting portion, the plurality of first holes and the plurality of second holes may be for example but are not limited to screw holes for screwing. However, the manner that the rack busbar of the server rack is fixed to the first outputting portion and the second outputting portion of a casing is time-consuming and inconvenient to assemble and detach, thereby affecting the convenience of subsequent maintenance.

SUMMARY

Therefore, one of objects of the present disclosure is to provide an electrical connection device which can overcome at least one deficiency of prior art.

Accordingly, an electrical connection device of the present disclosure comprises a busbar group, a rack busbar group and an adapter. The busbar group comprises a first busbar and a second busbar, the first busbar has a first body and a first transmitting portion provided to one side of the first body, the second busbar has a second body and a second transmitting portion provided to one side of the second body, the second body and the first body are constructed therebetween to be insulated from each other and be not conducted with each other. The rack busbar group comprises two rack busbars. The adapter pluggably mates with the first transmitting portion and the second transmitting portion of the busbar group and is configured so that the adapter is capable of floating relative to the busbar group along a left-right direction, the adapter further pluggably mates with the two rack busbars of the rack busbar group and is configured so that the adapter is capable of floating relative to the rack busbar group along an up-down direction.

In some embodiments, the first transmitting portion is formed with a first mating groove whose left end and right end are in form of opened shape, the second transmitting portion is formed with a second mating groove whose left end and right end are in form of opened shape; the adapter pluggably inserts into the first mating groove and the second mating groove, the adapter is formed with two inserting grooves, an upper end and a lower end of each inserting groove are in form of opened shape; the two rack busbars pluggably insert into the two inserting grooves respectively.

In some embodiments, the first transmitting portion comprises a first base plate and at least one first straddle type connector, the first base plate extends upwardly from the one side of the first body, the first straddle type connector is fixed to the first base plate and comprises a first insulative housing and a plurality of first power terminals provided to the first insulative housing, the first insulative housing is formed with a first mating groove whose left end and right end are in form of opened shape; the second transmitting portion comprises a second base plate and at least one second straddle type connector, the second base plate extends upwardly from the one side of the second body, the second straddle type connector is fixed to the second base plate and comprises a second insulative housing and a plurality of second power terminals provided to the second insulative housing, the second insulative housing is formed with a second mating groove whose left end and right end are in form of opened shape; the adapter comprises an insulative housing which allows the two rack busbars to pluggably insert therein and a first adapting plate and a second adapting plate which pluggably insert into the first mating groove and the second mating groove respectively; when the first adapting plate and the second adapting plate respectively insert into the first mating groove and the second mating groove, the first adapting plate and the second adapting plate respectively contact and electrically connect with the plurality of the first power terminals and the plurality of the second power terminals.

In some embodiments, the first transmitting portion comprises a plurality of first straddle type connectors which are fixed to the first base plate and are arranged along the left-right direction; the second transmitting portion comprises a plurality of second straddle type connectors which are fixed to the second base plate and are arranged along the left-right direction.

In some embodiments, the adapter comprises an insulative housing, two groups of power terminals, a first adapting plate and a second adapting plate, the insulative housing is formed with two inserting grooves which respectively allow the two rack busbars to insert therein, an upper end and a lower end of each inserting groove are in form of opened shape, the first adapting plate and the second adapting plate are pluggably insert into the first transmitting portion and the second transmitting portion respectively, the power terminals are respectively provided to the two inserting grooves, each power terminal has a plurality of contacting portions which extend toward an opening of the corresponding inserting groove and a connecting portion, the connecting portions of the power terminals are respectively connected to the first adapting plate and the second adapting plate, when the two rack busbars respectively insert into the two inserting grooves of the adapter, the two rack busbars respectively contact and electrically connect with the connecting portions of the power terminals.

In some embodiments, the first transmitting portion is formed with a first mating groove whose left end and right end are in form of opened shape, the second transmitting portion is formed with a second mating groove whose left end and right end are in form of opened shape, the adapter comprises an insulative housing, two groups of power terminals, a first adapting plate and a second adapting plate, the insulative housing is formed with two inserting grooves, an upper end and a lower end of each inserting groove are in form of opened shape, the power terminals are respectively provided to the two inserting grooves of the insulative housing, the first adapting plate and the second adapting plate are respectively connected to the power terminals, the first adapting plate and the second adapting plate pluggably insert into the first mating groove and the second mating groove respectively, the two rack busbars pluggably insert into the two inserting grooves respectively.

In some embodiments, the first adapting plate has a first flat plate body which inserts into the first mating groove and a first vertical plate body which extends from a side of the first flat plate body and is connected to the corresponding power terminal, the second adapting plate has a second flat plate body which inserts into the second mating groove and a second vertical plate body which extends from a side of the second flat plate body and is connected to the corresponding power terminal, the power terminals respectively contact and electrically connect with the two rack busbars.

In some embodiments, the first transmitting portion is a plate edge of the first body, the second transmitting portion is a plate edge of the second body, the adapter is formed with two mating grooves and two inserting grooves, a left end and a right end of each mating groove are in form of opened shape, an upper end and a lower end of each inserting groove are in form of opened shape, the first transmitting portion and the second transmitting portion pluggably insert into the two mating grooves respectively, the two rack busbars pluggably insert into the two inserting grooves respectively.

In some embodiments, the first transmitting portion is a plate edge of the first body, the second transmitting portion is a plate edge of the second body, the adapter comprises an insulative housing, a first straddle type connector and a second straddle type connector, the insulative housing allows the two rack busbars to pluggably insert therein, the first straddle type connector comprises a first insulative housing, and a first power terminal provided to the first insulative housing, the first insulative housing is formed with a first mating groove whose left end and right end are in form of opened shape, the second straddle type connector comprises a second insulative housing and a second power terminal provided to the second insulative housing, the second insulative housing is formed with a second mating groove whose left end and right end are in form of opened shape, when the first transmitting portion and the second transmitting portion respectively insert into the first mating groove and the second mating groove, the first transmitting portion and the second transmitting portion respectively contact and electrically connect with the first power terminal and the second power terminal.

In some embodiments, the adapter comprises an insulative housing, two groups of power terminals, a first adapting plate, a second adapting plate, a first straddle type connector and a second straddle type connector, the insulative housing is formed with two inserting grooves, an upper end and a lower end of each inserting groove are in form of opened shape, the power terminals respectively are provided to the two inserting grooves, the first adapting plate and the second adapting plate are respectively connected to the power terminals, the first straddle type connector and the second straddle type connector are respectively fixed to the first adapting plate and the second adapting plate, the first transmitting portion and the second transmitting portion pluggably insert into the first straddle type connector and the second straddle type connector respectively, each power terminal has a plurality of contacting portions which extend toward an opening of the corresponding inserting groove and a connecting portion, the connecting portions of the power terminals are respectively connected to the first adapting plate and the second adapting plate, when the two rack busbars respectively insert into the two inserting grooves of the adapter, the two rack busbars respectively contact and electrically connect with the connecting portions of the power terminals.

In some embodiments, the first transmitting portion is a plate edge of the first body, the second transmitting portion is a plate edge of the second body, the adapter comprises an insulative housing, two groups of power terminals, a first adapting plate, a second adapting plate, a first straddle type connector and a second straddle type connector, the insulative housing is formed with two inserting grooves, an upper end and a lower end of each inserting groove are in form of opened shape, the power terminals are respectively provided to the two inserting grooves, the first adapting plate and the second adapting plate are respectively connected to the power terminals, the first straddle type connector and the second straddle type connector are respectively fixed to the first adapting plate and the second adapting plate, the first straddle type connector comprises a first insulative housing and a first power terminal provided to the first insulative housing, the first insulative housing is formed with a first mating groove whose left end and right end are in form of opened shape, the second straddle type connector comprises a second insulative housing and a second power terminal provided to the second insulative housing, the second insulative housing is formed with a second mating groove whose left end and right end are in form of opened shape, the first transmitting portion and the second transmitting portion pluggably insert into the first mating groove and the second mating groove respectively, the two rack busbars pluggably insert into the two inserting grooves respectively.

In some embodiments, the first adapting plate has a first flat plate body which is fixed to the first straddle type connector and a first vertical plate body which extends from a side of the first flat plate body and is connected to the corresponding power terminal, the second adapting plate has a second flat plate body which is fixed to the second straddle type connector and a second vertical plate body which extends from a side of the second flat plate body and is connected to the corresponding power terminal.

In some embodiments, the adapter comprises a strengthening cover, the strengthening cover is formed with a first retaining groove which allows the first vertical plate body to be received therein and retains the first vertical plate body and a second retaining groove which allows the second vertical plate body to be received therein and retains the second vertical plate body.

In some embodiments, the first transmitting portion is a plate edge of the first body, the second transmitting portion is a plate edge of the second body, the adapter comprises an insulative housing, a strengthening cover and two groups of power terminals, the insulative housing allows the two rack busbars to pluggably insert therein, the strengthening cover is provided to the insulative housing and is formed with two mating grooves, a left end and a right end of each mating groove are in form of opened shape, the power terminals are respectively provided to the two mating grooves, when the first transmitting portion and the second transmitting portion respectively insert into the two mating grooves, the first transmitting portion and the second transmitting portion respectively contact and electrically connect with the power terminals.

In some embodiments, the adapter comprises an insulative housing, a strengthening cover and two groups of power terminals, the insulative housing is formed with two inserting grooves, an upper end and a lower end of each inserting groove are in form of opened shape, the strengthening cover is provided to the insulative housing and pluggably inserts into the first transmitting portion and the second transmitting portion, the power terminals are respectively provided to the two inserting grooves, when the two rack busbars respectively insert into the two inserting grooves, the two rack busbars respectively contact and electrically connect with the power terminals.

In some embodiments, the first transmitting portion is a plate edge of the first body, the second transmitting portion is a plate edge of the second body, the adapter comprises an insulative housing, a strengthening cover and two groups of power terminals, the insulative housing is formed with two inserting grooves, an upper end and a lower end of each inserting groove are in form of opened shape, the strengthening cover is provided to the insulative housing and is formed with two mating grooves, a left end and a right end of each mating groove are in form of opened shape, each power terminal has a connecting portion which is provided to the insulative housing and the strengthening cover and a plurality of first contacting portions and a plurality of second contacting portions which are connected to opposite ends of the connecting portion, the plurality of the first contacting portions extend toward an opening of the corresponding inserting groove, the plurality of the second contacting portion extend toward an opening of the corresponding mating groove, when the first transmitting portion and the second transmitting portion respectively insert into the two mating grooves, the first transmitting portion and the second transmitting portion respectively contact and electrically connect with the second contacting portions of the power terminals, when the two rack busbars respectively insert into the two inserting grooves, the two rack busbars respectively contact and electrically connect with the first contacting portions of the power terminals.

In some embodiments, the connecting portion of each power terminal has a vertical plate segment and a flat plate segment which is connected to an end of the vertical plate segment, the plurality of the first contacting portions are connected to the vertical plate segment, the plurality of the second contacting portions are connected to the flat plate segment, the strengthening cover further is formed with two retaining grooves, each retaining groove has a vertical groove portion and a flat groove portion which is communicated to an end of the vertical groove portion, the vertical groove portion allows the vertical plate segment of the corresponding power terminal to be provided therein and retains the vertical plate segment, the flat groove portion allows the flat plate segment of the corresponding power terminal to be provided therein and retains the flat plate segment.

In some embodiments, the strengthening cover is a single-piece component made by an integrally forming manner.

In some embodiments, the first busbar further has a plurality of first mounting portions which are provided to the other side of the first body, the second busbar further has a plurality of second mounting portions which are provided to the other side of the second body, the plurality of the first mounting portions and the plurality of the second mounting portions are alternately arranged.

In some embodiments, the first busbar further has a plurality of first mounting portions which are provided to the other side of the first body, the second busbar further has a plurality of second mounting portions which are provided to the other side of the second body, the electrical connection device further comprises a plurality of connectors, the plurality of connectors are respectively mounted to the plurality of first mounting portions and the plurality of second mounting portions.

In some embodiments, the electrical connection device further comprises a panel and a plurality of retaining assemblies, the panel is formed with a plurality of apertures, each retaining assembly is provided to the corresponding aperture and retains the panel to the insulative housing, a circumferential edge of each aperture and the corresponding retaining assembly are spaced apart from each other, each retaining assembly is capable of floating in the corresponding aperture along the left-right direction and the up-down direction.

The present disclosure at least has the following effect: by that the adapter is connected between the busbar group and the rack busbar group, an assembling operation and a detaching operation of the rack busbar group and the busbar group can be rapidly and conveniently performed, so that convenience of subsequent maintenance of the rack busbar group and the busbar group can be promoted. By that the adapter is capable of floating relative to the busbar group along the left-right direction and the adapter is capable of floating relative to the two rack busbars along the up-down direction, smoothness in the mating process of the busbar group, the adapter and the rack busbar group can be promoted and stability and reliability can be promoted after the busbar group, the adapter and the rack busbar group are mated with each other, so the object of the present disclosure can be achieved indeed.

BRIEF DESCRIPTION OF THE DRAWINGS

Other features and effects of the present disclosure will be apparent from embodiments with reference to the drawings, in which.

DETAILED DESCRIPTION

Figure 1:
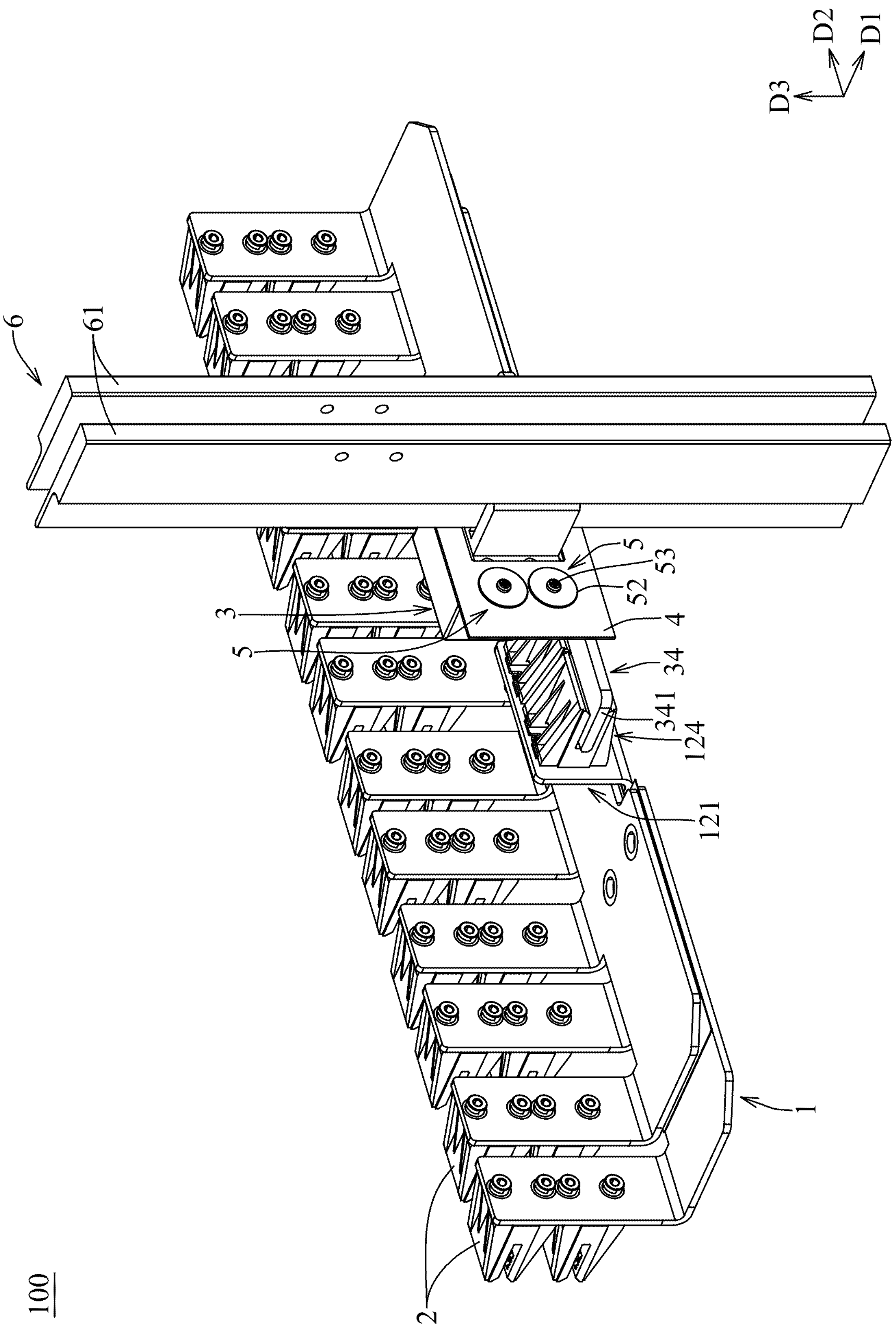
FIG. 1 is a perspective view of a first embodiment of an electrical connection device of the present disclosure.

Before the present disclosure is described in detail, it is noted that the similar elements are indicated by the same reference numerals in the following description.

Figure 2:
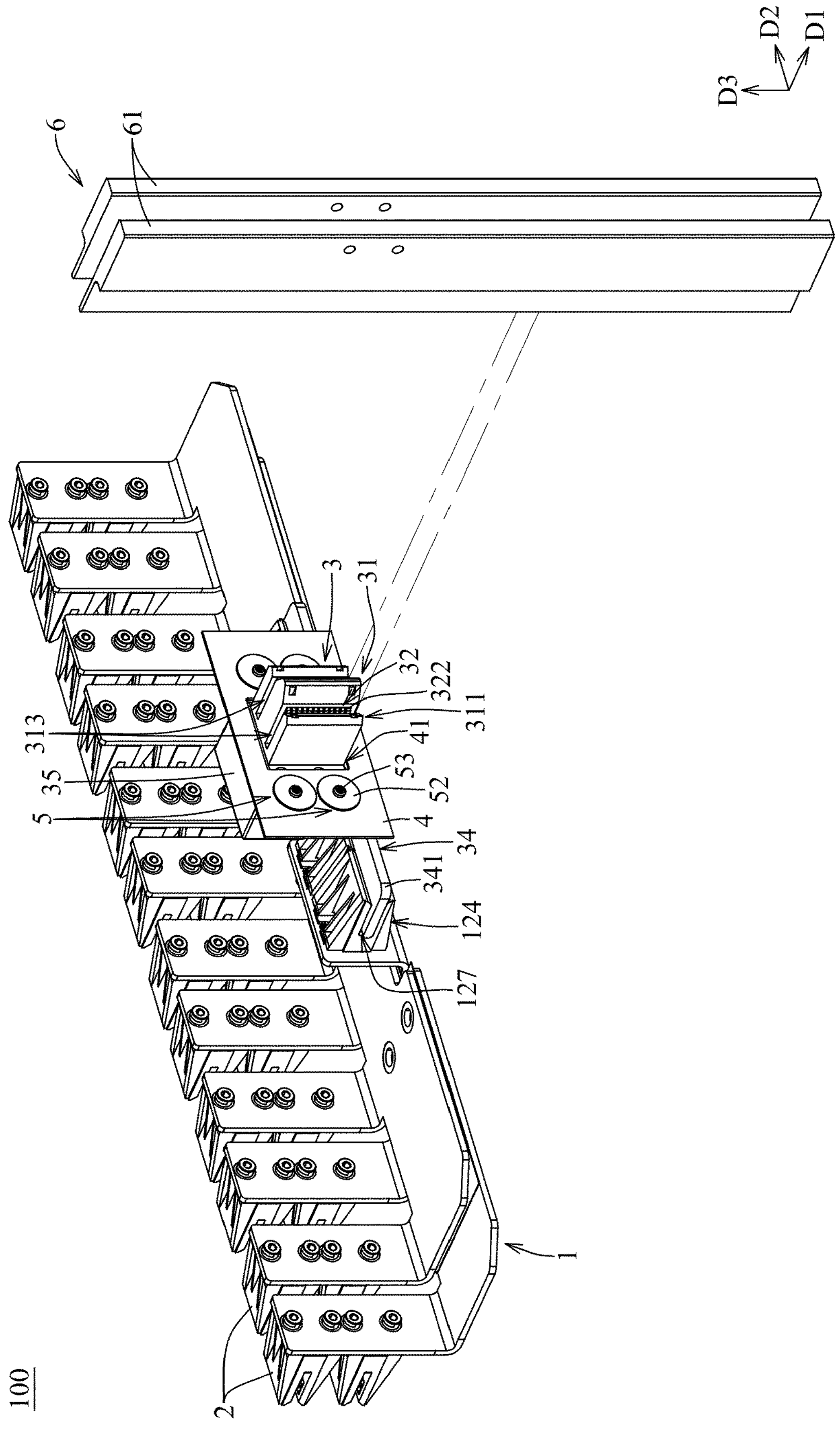
FIG. 2 is a perspective exploded view of the first embodiment illustrating an assembling relationship among a busbar group, a plurality of connectors, an adapter, a panel, a plurality of retaining assemblies and a rack busbar group.
Figure 3:
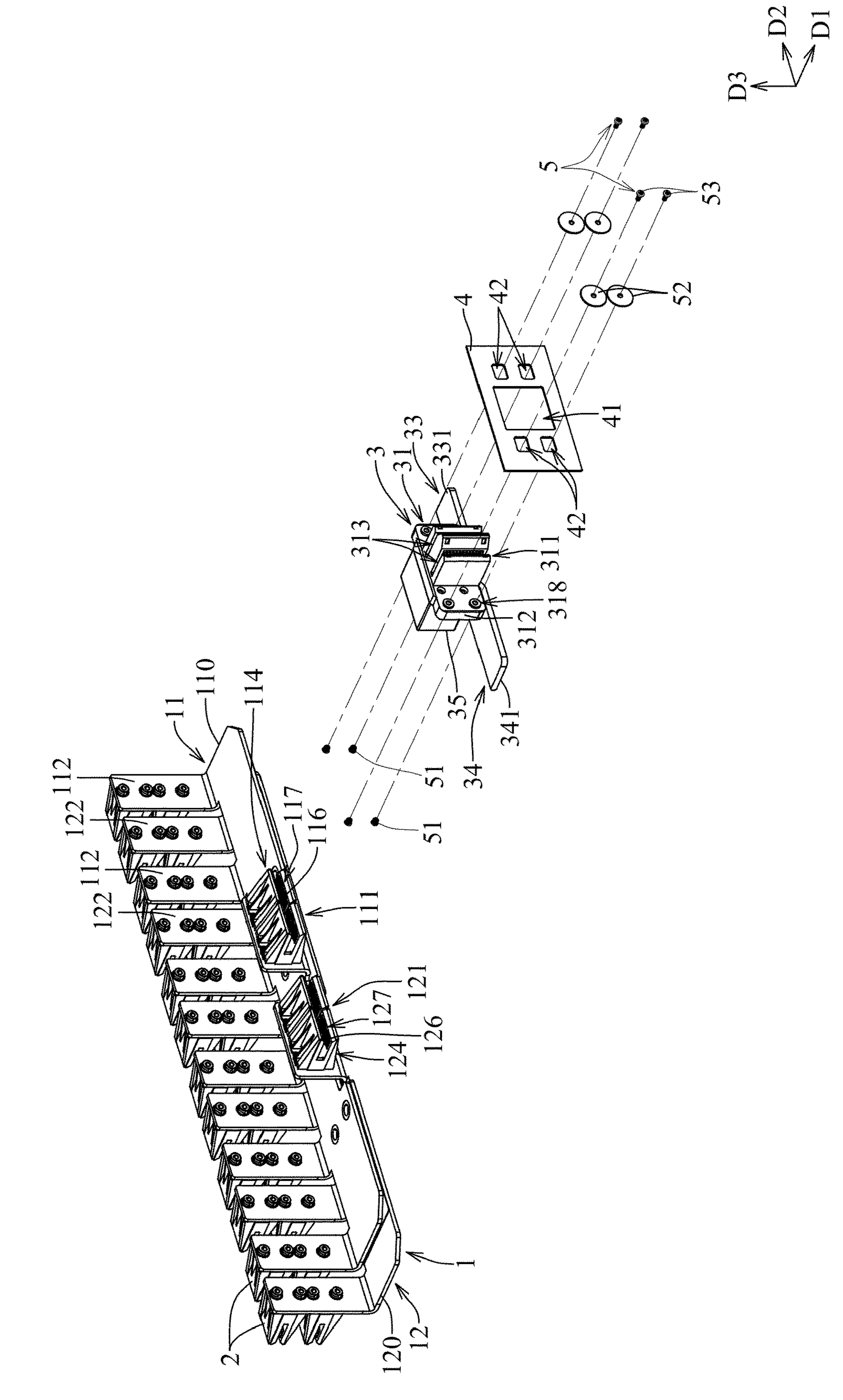
FIG. 3 is a partial perspective exploded view of the first embodiment illustrating an assembling relationship among the busbar group, the adapter, the panel and the plurality of retaining assemblies.

Referring to FIG. 1, FIG. 2 and FIG. 3, a first embodiment of an electrical connection device 100 of the present disclosure includes a busbar group 1, a plurality of connectors 2, an adapter 3, a panel 4, a plurality of retaining assemblies 5 and a rack busbar group 6. The busbar group 1, the plurality of connectors 2 and the adapter 3 are provided to a server box (not shown), the panel 4 may be constructed to a casing (not shown) of the server box, the rack busbar group 6 is provided to a server rack (not shown).

For sake of convenience of the later description, in the electrical connection device 100, a front-rear direction D1, a left-right direction D2 perpendicular to the front-rear direction D1 and an up-down direction D3 perpendicular to the front-rear direction D1 and the left-right direction D2 are defined. In FIG. 1, the front-rear direction D1 is that a direction to which an arrow points is front and a direction opposite to front is rear. The left-right direction D2 is that a direction to which an arrow points is left and a direction opposite to left is right. The up-down direction D3 is that a direction to which an arrow points is up and a direction opposite to up is down.

Figure 4:
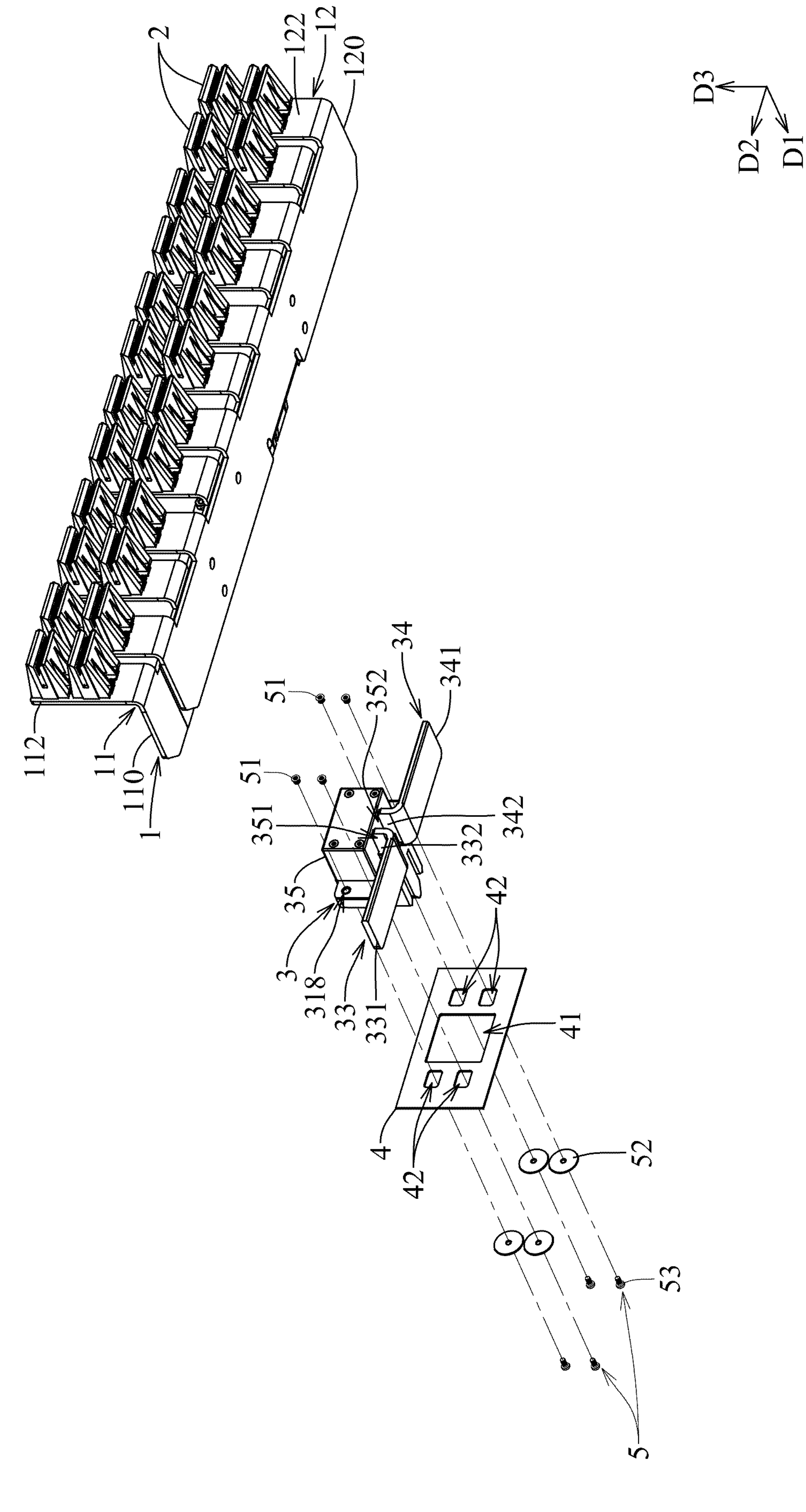
FIG. 4 is a partial perspective exploded view of the first embodiment viewed from another angle.
Figure 5:
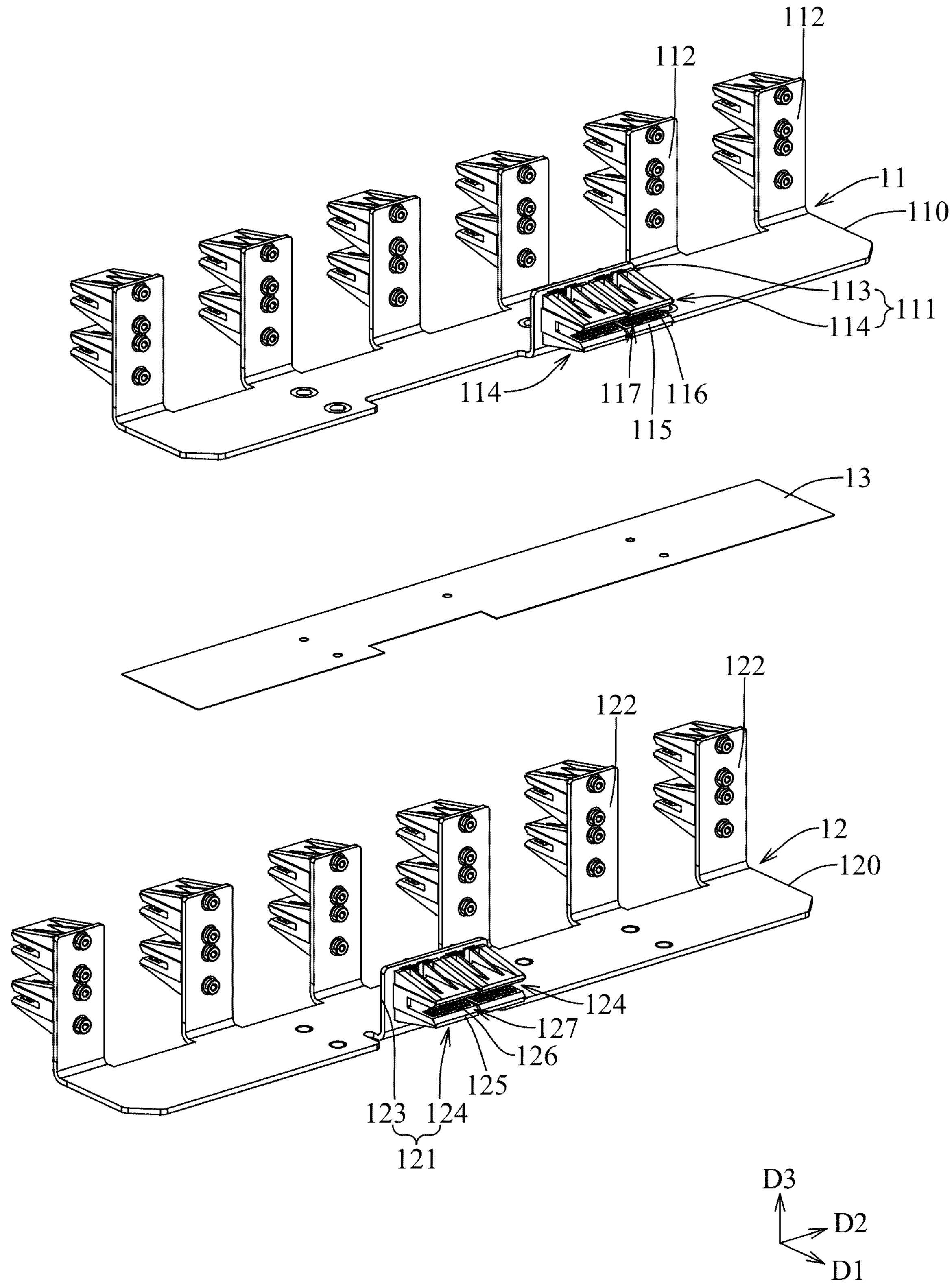
FIG. 5 is a perspective exploded view of the busbar group of the first embodiment illustrating an assembling relationship among a first busbar, a second busbar and an insulative layer.
Figure 6:
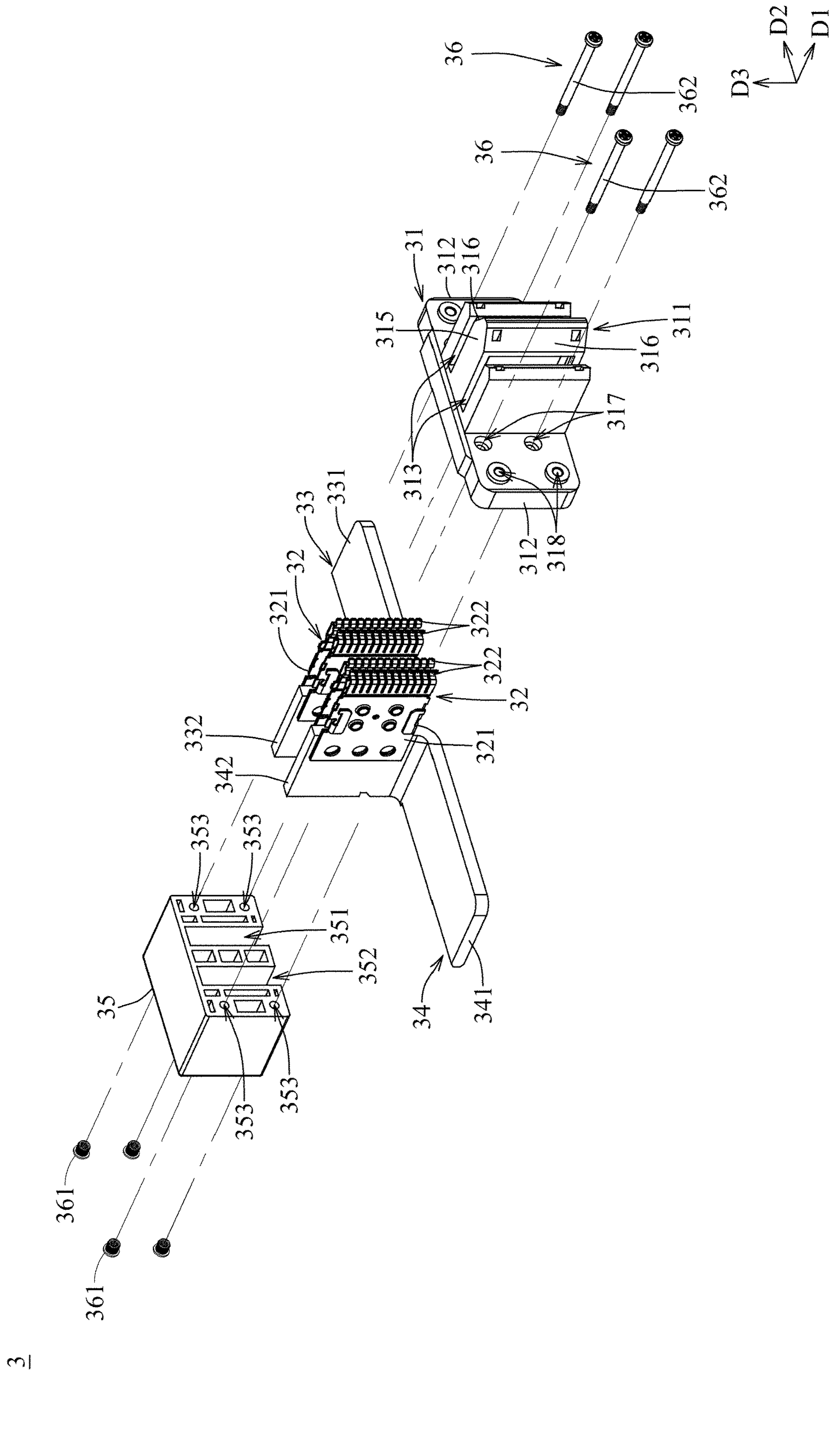
FIG. 6 is a perspective exploded view of the adapter of the first embodiment illustrating assembling relationship among an insulative housing, two groups of power terminals, a first adapting plate, a second adapting plate, a strengthening cover and a plurality of fastening assemblies.
Figure 7:
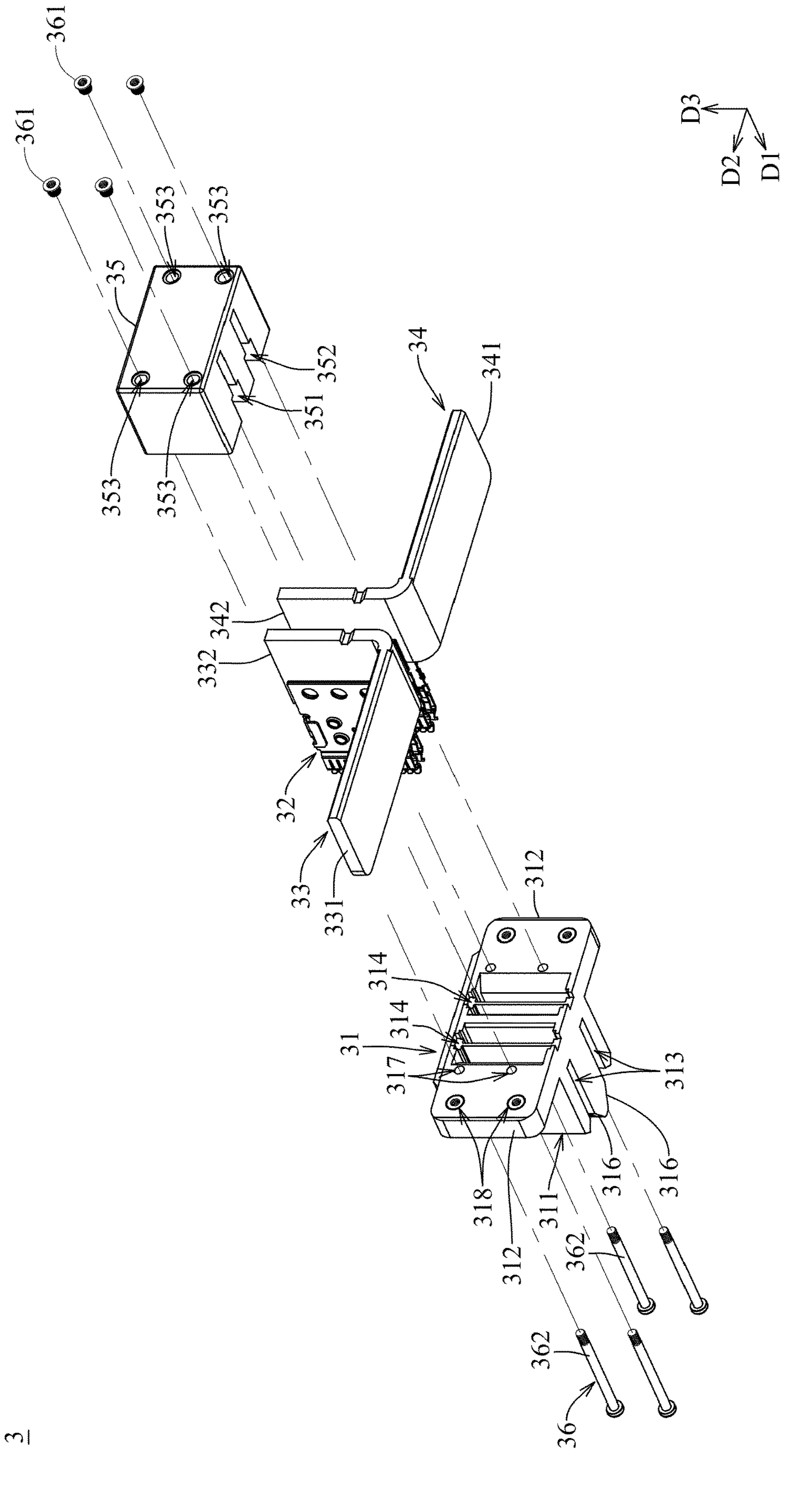
FIG. 7 is a perspective exploded view of the adapter of the first embodiment viewed from another angle.

Referring to FIG. 3, FIG. 4 and FIG. 5, the busbar group 1 includes a first busbar 11 and a second busbar 12. The first busbar 11 has a first body 110, a first transmitting portion 111 which is provided to one side of the first body 110, and a plurality of first mounting portions 112 which are provided to the other side of the first body 110. The first body 110 is in form of elongated flat plate shape and a length direction of the first body 110 extends along the left-right direction D2. The first transmitting portion 111 and the plurality of first mounting portions 112 are respectively provided to a front side of the first body 110 and a rear side of the first body 110.

The first transmitting portion 111 includes a first base plate 113 and a plurality of first straddle type connectors 114. The first base plate 113 integrally extends upwardly from the front side of the first body 110. The first base plate 113 is in form of elongated upright plate shape and a length direction of the first base plate 113 extends along the left-right direction D2. The plurality of first straddle type connectors 114 are fixed to a front plate surface of the first base plate 113 and are arranged along the left-right direction D2. The number of the plurality of first straddle type connectors 114 is two as an example but is not limited thereto. Each first straddle type connector 114 includes a first insulative housing 115 and a plurality of first power terminals 116 provided to the first insulative housing 115. The first insulative housing 115 is fixed to the front plate surface of the first base plate 113 by for example screws for screwing. The first insulative housing 115 is formed with a first mating groove 117 which extends along the left-right direction D2, the first mating groove 117 penetrates the first insulative housing 115 and a left end and a right end of the first mating groove 117 are in form of opened shape. Each first power terminal 116 partially extends into the first mating groove 117.

The plurality of first mounting portions 112 integrally extends upwardly from the rear side of the first body 110 and are arranged and spaced apart from each other along the left-right direction D2. Each first mounting portion 112 in form of elongated upright plate shape and a length direction of the first mounting portion 112 extends along the up-down direction D3.

The first body 110, the first base plate 113 and the plurality of first mounting portions 112 of the first busbar 11 are made of a copper material which may carry a high current and has good heat dissipation, the first body 110, the first base plate 113 and the plurality of first mounting portions 112 are formed by a processing, such as stamping and bending.

The second busbar 12 has a second body 120, a second transmitting portion 121 which is provided to one side of the second body 120, and a plurality of second mounting portions 122 which are provided to the other side of the second body 120. The second body 120 is in form of elongated flat plate shape and a length direction of the second body 120 extends along the left-right direction D2. The second body 120 is positioned under the first body 110, the second body 120 and the first body 110 are constructed therebetween to be insulated from each other and be not conducted with each other. The second transmitting portion 121 and the plurality of second mounting portions 122 are respectively provided to a front side of the second body 120 and a rear side of the second body 120.

The first transmitting portion 111 and the second transmitting portion 121 are arranged and spaced apart from each other along the left-right direction D2. The second transmitting portion 121 includes a second base plate 123 and a plurality of second straddle type connectors 124. The second base plate 123 integrally extends upwardly from the front side of the second body 120. The second base plate 123 is in form of elongated upright plate shape and a length direction of the second base plate 123 extends along the left-right direction D2. The plurality of second straddle type connectors 124 are fixed to a front plate surface of the second base plate 123 and are arranged along the left-right direction D2. The number of the plurality of second straddle type connectors 124 is two as an example but is not limited thereto. Each second straddle type connector 124 includes a second insulative housing 125 and a plurality of second power terminals 126 provided to the second insulative housing 125. The second insulative housing 125 is fixed to the front plate surface of the second base plate 123 by for example screws for screwing. The second insulative housing 125 is formed with a second mating groove 127 which extends along the left-right direction D2, the second mating groove 127 penetrates the second insulative housing 125 and a left end and a right end of the second mating groove 127 are in form of opened shape. Each second power terminal 126 partially extends into the second mating groove 127.

The plurality of second mounting portions 122 integrally extend upwardly from the rear side of the second body 120 and are arranged and spaced apart from each other along the left-right direction D2. Each second mounting portion 122 is in form of elongated upright plate shape and a length direction of the second mounting portion 122 extends along the up-down direction D3. The plurality of second mounting portions 122 and the plurality of first mounting portions 112 are alternately arranged along the left-right direction D2.

The second body 120, the second base plate 123 and the plurality of second mounting portions 122 of the second busbar 12 are made of a copper material which may carry a high current and has good heat dissipation, the second body 120, the second base plate 123 and the plurality of second mounting portions 122 are formed by a processing, such as stamping and bending.

In order to make that the second body 120 and the first body 110 are constructed therebetween to be insulated from each other and be not conducted with each other, the busbar group 1 of the first embodiment further includes an insulative layer 13 which is provided between the first body 110 and the second body 120, is used to space the first body 110 and the second body 120 apart from each other and avoids the first body 110 and the second body 120 contacting each other and conducting with each other. In the first embodiment, the insulative layer 13 takes an insulative sheet as an example, the insulative layer 13 is adhered between the first body 110 and the second body 120 by for example an insulative adhesive. Certainly, the insulative layer 13 also may be fixed between the first body 110 and the second body 120 by screws for screwing, and is not limited to adhering by the insulative adhesive. The insulative layer 13 also may be constituted by an insulative paint or an insulative adhesive which is coated between the first body 110 and the second body 120, and is not limited to the insulative sheet. That is to say, the insulative layer 13 may be a sheet structural layer constituted by the insulative sheet, also may be the insulative paint or the insulative adhesive constituted by a coating layer.

The plurality of connectors 2 are respectively mounted to the plurality of first mounting portions 112 of the first busbar 11 and the plurality of second mounting portions 122 of the second busbar 12. The corresponding connector 2 which is mounted to each first mounting portion 112 is fixed to a rear plate surface of the first mounting portion 112 by for example screws for screwing. The corresponding connector 2 which is mounted to each second mounting portion 122 is fixed to a rear plate surface of the second mounting portion 122 by for example screws for screwing. The plurality of connectors 2 are used to be electrically connected to a plurality of power supply units (PSU) (not shown) and a plurality of battery backup units (BBU) (not shown) in the server box. In the first embodiment, the first busbar 11 is connected to a positive electrode of each power supply unit or a positive electrode of each battery backup unit by the corresponding connectors 2, and the second busbar 12 is connected to a negative electrode of each power supply unit or a negative electrode of each battery backup unit by the corresponding connectors 2.

Referring to FIG. 3, FIG. 4, FIG. 6 and FIG. 7, the adapter 3 includes an insulative housing 31, two groups of power terminals 32, a first adapting plate 33, a second adapting plate 34, a strengthening cover 35 and a plurality of fastening assemblies 36. The insulative housing 31 has a mating segment 311 and two side wing segments 312 which are respectively extend outwardly from a left side and a right side of the mating segment 311. The mating segment 311 is formed with two inserting grooves 313 which are spaced apart from each other along the left-right direction D2 and two mounting grooves 314 which are respectively communicated to rear ends of the two inserting grooves 313. An upper end and a lower end of each inserting groove 313 are in form of opened shape, an opening of each inserting groove 313 is toward the front. The mating segment 311 has a guiding plate portion 315 which is interposed between the two inserting grooves 313. The guiding plate portion 315 has two guiding oblique surfaces 316 which are spaced apart from each other along the left-right direction D2, the two guiding oblique surface 316 obliquely extend outwardly from front to rear. Each side wing segment 312 is formed with two first penetrating holes 317 which are spaced apart from each other along the up-down direction D3 and are adjacent to the mating segment 311 and two second penetrating holes 318 which are spaced apart from each other along the up-down direction D3 and are respectively positioned outer sides of the two first penetrating holes 317.

The power terminals 32 are spaced apart from each other along the left-right direction D2. Each power terminal 32 extends into the corresponding inserting groove 313 via the corresponding mounting groove 314. Each power terminal 32 has a connecting portion 321 and a plurality of contacting portions 322. The connecting portion 321 is provided in the corresponding mounting groove 314 and the corresponding inserting groove 313 and partially protrudes from a rear end of the mating segment 311. The plurality of contacting portions 322 are connected to a front end of the connecting portion 321, are arranged along the up-down direction D3, are provided in the corresponding inserting groove 313 and extends toward the opening of the corresponding inserting groove 313.

The first adapting plate 33 and the second adapting plate 34 are made of a copper material which may carry a high current and has good heat dissipation. The first adapting plate 33 and the second adapting plate 34 are arranged and spaced apart from each other along the left-right direction D2. The first adapting plate 33 is in form of L-shape and has a first flat plate body 331 which is used to insert into the plurality of first mating grooves 117 and a first vertical plate body 332 which extends upwardly from a right side of the first flat plate body 331 and is connected to the connecting portion 321 of the corresponding power terminal 32. The first vertical plate body 332 and the connecting portion 321 may be securely connected together by for example riveting or welding. The second adapting plate 34 is in form of L-shape and has a second flat plate body 341 which is used to insert into the plurality of second mating grooves 127 and a second vertical plate body 342 which extends upwardly from a left side of the second flat plate body 341 and is connected to the connecting portion 321 of the corresponding power terminal 32. The second vertical plate body 342 and the connecting portion 321 may be securely connected together by for example riveting or welding. The first flat plate body 331 of the first adapting plate 33 and the second flat plate body 341 of the second adapting plate 34 respectively insert into the plurality of first mating grooves 117 and the plurality of second mating grooves 127 and are configured so that the first adapting plate 33 and the second adapting plate 34 are capable of floating respectively relative to the plurality of first mating grooves 117 and the plurality of second mating grooves 127 along the left-right direction D2.

The strengthening cover 35 is made of an insulative material. The strengthening cover 35 covers the first vertical plate body 332 of the first adapting plate 33 and the second vertical plate body 342 of the second adapting plate 34 and abuts against a rear end of the insulative housing 31. The strengthening cover 35 is formed with a first retaining groove 351, a second retaining groove 352 and a plurality of through holes 353. The first retaining groove 351 and the second retaining groove 352 are spaced apart from each other along the left-right direction D2. The first retaining groove 351 allows the first vertical plate body 332 of the first adapting plate 33 to be receive therein and retains the first vertical plate body 332. The second retaining groove 352 allows the second vertical plate body 342 of the second adapting plate 34 to be received therein and retains the second vertical plate body 342. The plurality of through holes 353 respectively correspond to the first penetrating holes 317 of the insulative housing 31. By that the first retaining groove 351 and the second retaining groove 352 respectively retain the first vertical plate body 332 and the second vertical plate body 342, the strengthening cover 35 can function as supporting the first vertical plate body 332 and the second vertical plate body 342, so that a structural strength between the first adapting plate 33 and the second adapting plate 34 can be strengthened.

Each fastening assembly 36 has a nut 361 and a bolt 362. The nut 361 is provided in the corresponding through hole 353 of the strengthening cover 35. The bolt 362 is provided to the corresponding first penetrating hole 317 of the insulative housing 31 and the corresponding through hole 353 of the strengthening cover 35 and is screwed to the nut 361. Therefore, the fastening assembly 36 can lock the insulative housing 31 and the strengthening cover 35 together.

Referring to FIG. 2, FIG. 3 and FIG. 4, the panel 4 is formed with a penetrating hole 41 and a plurality of apertures 42 which are respectively positioned at a left side and a right side of the penetrating hole 41. The mating segment 311 of the insulative housing 31 passes through the penetrating hole 41 from rear to front and partially protrudes from a front plate surface of the panel 4. The two side wing segments 312 of the insulative housing 31 abut against a rear plate surface of the panel 4, and each second penetrating hole 318 and the corresponding aperture 42 are aligned with each other in position. For example, each aperture 42 is an elongated hole and a length direction of the aperture 42 extends along the left-right direction D2.

The plurality of retaining assemblies 5 are used to retain the panel 4 to the insulative housing 31. In the first embodiment, each retaining assembly 5 has a nut 51, a gasket 52 and a bolt 53. The nut 51 is provided in the corresponding second penetrating hole 318 of the insulative housing 31. The gasket 52 abuts against the front plate surface of the panel 4 and is aligned with the corresponding second penetrating hole 318 in position. The bolt 53 is provided to the gasket 52, the corresponding aperture 42 and the corresponding second penetrating hole 318 and is screwed to the nut 51. Therefore, the retaining assembly 5 can fix the panel 4 to the insulative housing 31.

Figure 8:
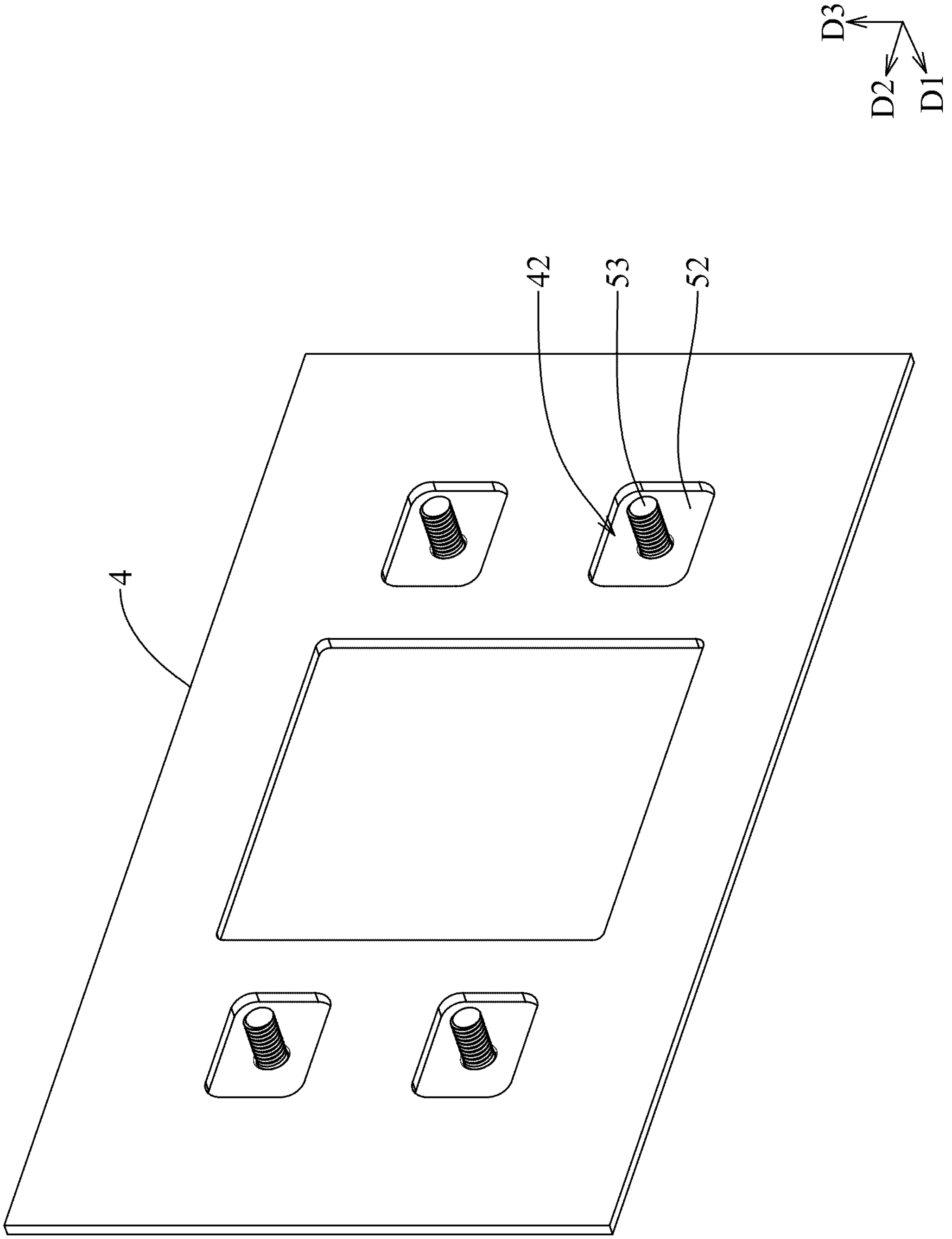
FIG. 8 is a perspective view of the panel and the plurality of retaining assemblies of the first embodiment.

Referring to FIG. 2, FIG. 4 and FIG. 8, each aperture 42 is larger than the corresponding bolt 53 of the retaining assembly 5, and a circumferential edge of each aperture 42 is spaced apart from the bolt 53, so that the bolt 53 of each retaining assembly 5 is capable of floating in the corresponding aperture 42 along the left-right direction D2 and the up-down direction D3. Therefore, the plurality of retaining assemblies 5 are capable of bringing the adapter 3 to float relative to the panel 4 along the left-right direction D2 and the up-down direction D3.

Referring to FIG. 1 and FIG. 2, the rack busbar group 6 includes two rack busbars 61. The two rack busbars 61 are made of a copper material which may carry a high current and has good heat dissipation and are spaced apart from each other along the left-right direction D2. The two rack busbars 61 each are in form of long strip shape and a length direction of the rack busbar 61 extends along the up-down direction D3. The two rack busbars 61 pluggably insert into the two inserting grooves 313 of the adapter 3 respectively, and are configured so that the adapter 3 is capable of floating relative to the two rack busbars 61 along the up-down direction D3.

Referring to FIG. 2 and FIG. 3, when assembling among the busbar group 1, the adapter 3 and the rack busbar group 6 of the electrical connection device 100 is performed, firstly, the first flat plate body 331 of the first adapting plate 33 and the second flat plate body 341 of the second adapting plate 34 of the adapter 3 respectively insert into the plurality of first mating grooves 117 of the plurality of first straddle type connectors 114 and the plurality of second mating grooves 127 of the plurality of second straddle type connectors 124. When the first flat plate body 331 of The first adapting plate 33 and the second flat plate body 341 of the second adapting plate 34 respectively insert into the plurality of first mating grooves 117 and the plurality of second mating grooves 127, the first flat plate body 331 and the second flat plate body 341 respectively contact and electrically connect with the first power terminals 116 and the second power terminals 126. Because each first mating groove 117 and each second mating groove 127 each are in form of opened shape at the left end and the right end thereof, the first flat plate body 331 and the second flat plate body 341 respectively insert into the plurality of first mating grooves 117 and the plurality of second mating grooves 127 and are capable of floating along the left-right direction D2, so that convenience of inserting of the first flat plate body 331 and the second flat plate body 341 can be promoted.

Figure 9:
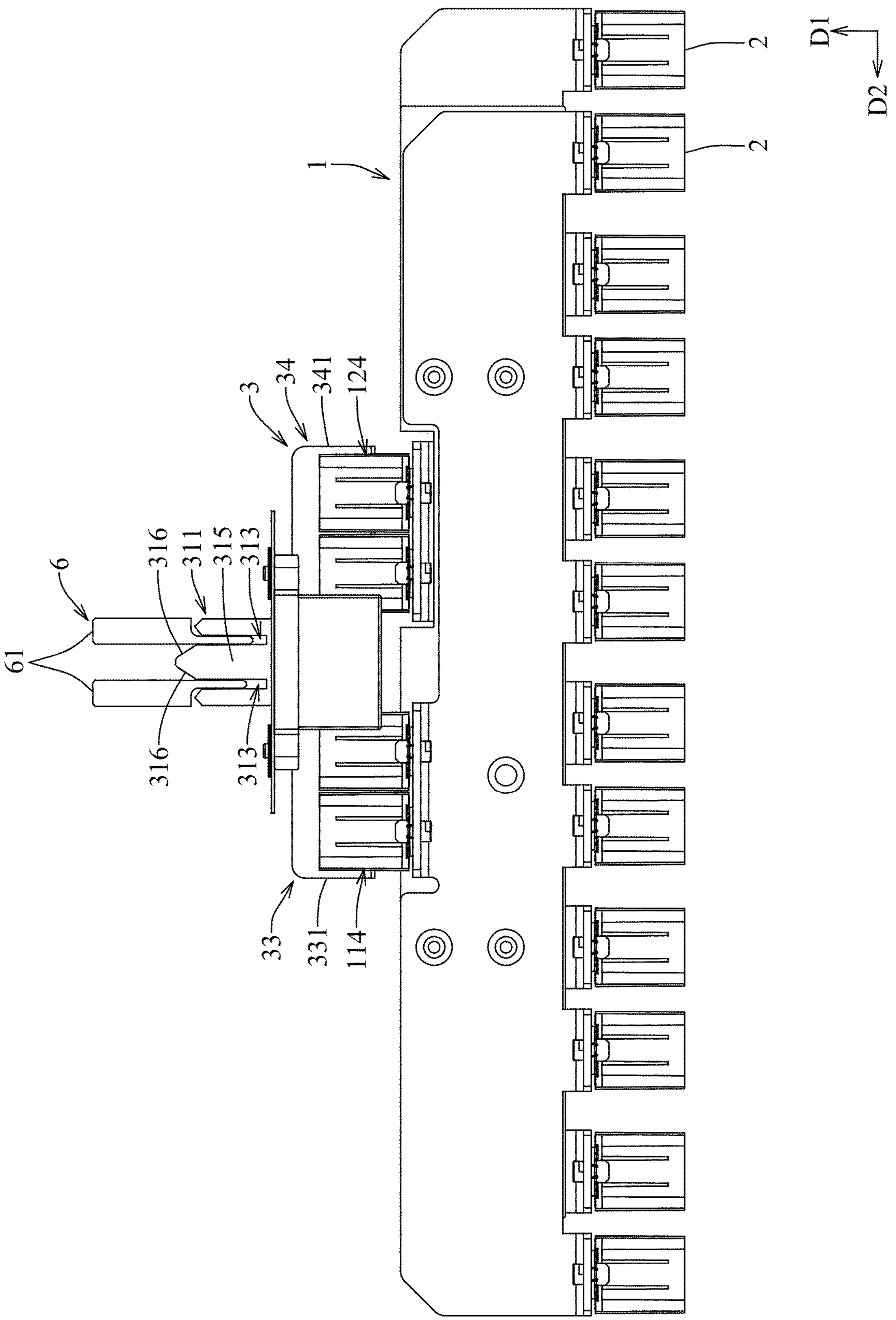
FIG. 9 is a top view of the first embodiment.

Referring to FIG. 1, FIG. 2 and FIG. 9, next, the rack busbar group 6 moves rearwardly toward the mating segment 311 of the adapter 3. When the two rack busbars 61 of the rack busbar group 6 have a position offset to the left in the left-right direction D2 to be not aligned with the two inserting grooves 313 respectively, a rear end of the rack busbar 61 at a right side of the two rack busbars 61 will first contact and slide on the guiding oblique surface 316 at a right side of the guiding plate portion 315 of the mating segment 311, the two rack busbars 61 will be guided by the guiding plate portion 315 to be correct in position and to be respectively aligned with the two inserting grooves 313. Therefore, the position offset to the left with respect to the two rack busbars 61 in the left-right direction D2 can be overcome, so that the two rack busbars 61 can smoothly insert into the two inserting grooves 313, respectively. When the two rack busbars 61 of the rack busbar group 6 has a position offset to the right in the left-right direction D2 and are not aligned with the two inserting grooves 313 respectively, a rear end of the rack busbar 61 at a left side of the two rack busbars 61 will first contact and slide on the guiding oblique surface 316 at a left side of the guiding plate portion 315 of the mating segment 311, the two rack busbars 61 will be guided by the guiding plate portion 315 to be correct in position and to be aligned with the two inserting grooves 313 respectively. Therefore, the position offset to the right with respect to the two rack busbars 61 in the left-right direction D2 can be overcome, so that the two rack busbars 61 can smoothly insert into the two inserting grooves 313, respectively. When the two rack busbars 61 respectively insert into the two inserting grooves 313, the two rack busbars 61 respectively contact and electrically connect with the contacting portions 322 of the power terminals 32.

When detaching among the busbar group 1, the adapter 3 and the rack busbar group 6 is performed, firstly, the rack busbar group 6 is directly pulled forwardly to make the rack busbar group 6 away from the adapter 3. When the two rack busbars 61 respectively leave the two inserting grooves 313, detaching of the rack busbar group 6 is completed. Subsequently, the adapter 3 is directly pulled forwardly or the busbar group 1 is pulled rearwardly, so as to make the adapter 3 and the busbar group 1 away from each other. When the first flat plate body 331 of the first adapting plate 33 and the second flat plate body 341 of the second adapting plate 34 respectively leave the plurality of first mating grooves 117 (as shown in FIG. 3) and the plurality of second mating grooves 127, detaching of the adapter 3 and the busbar group 1 is completed.

By that the first adapting plate 33 and the second adapting plate 34 of the adapter 3 respectively insert into the plurality of first mating grooves 117 and the plurality of second mating grooves 127 and the two inserting grooves 313 respectively allow the two rack busbars 61 to pluggably insert therein, the rack busbar group 6 and the busbar group 1 can rapidly and conveniently perform an assembling operation and a detaching operation, so that convenience of subsequent maintenance of the rack busbar group 6 and the busbar group 1 can be promoted.

By the first adapting plate 33 and the second adapting plate 34 are capable of floating respectively relative to the plurality of first mating grooves 117 and the plurality of second mating grooves 127 along the left-right direction D2, a mating process between the adapter 3 and the busbar group 1 can be smoother, and the adapter 3 and the busbar group 1 can be stably maintained to be in electrical connection state after the adapter 3 and the busbar group 1 are mated with each other. By that the two inserting grooves 313 are capable of floating respectively relative to the two rack busbars 61 along the up-down direction D3, the mating process between the rack busbar group 6 and the adapter 3 can smoother, and the rack busbar group 6 and the adapter 3 can be stably maintained to be in electrical connection state after the rack busbar group 6 and the adapter 3 are mated with each other. Therefore, stability and reliability among the busbar group 1, the adapter 3 and the rack busbar group 6 can be promoted after the busbar group 1, the adapter 3 and the rack busbar group 6 are mated with each other.

It is noted that, the electrical connection device 100 of the first embodiment also may make the number of the first straddle type connector 114 and the number of the second straddle type connector 124 each provided as one as desired, and so the number of the first straddle type connector 114 and the number of the second straddle type connector 124 each are not limited to plurality.

Figure 10:
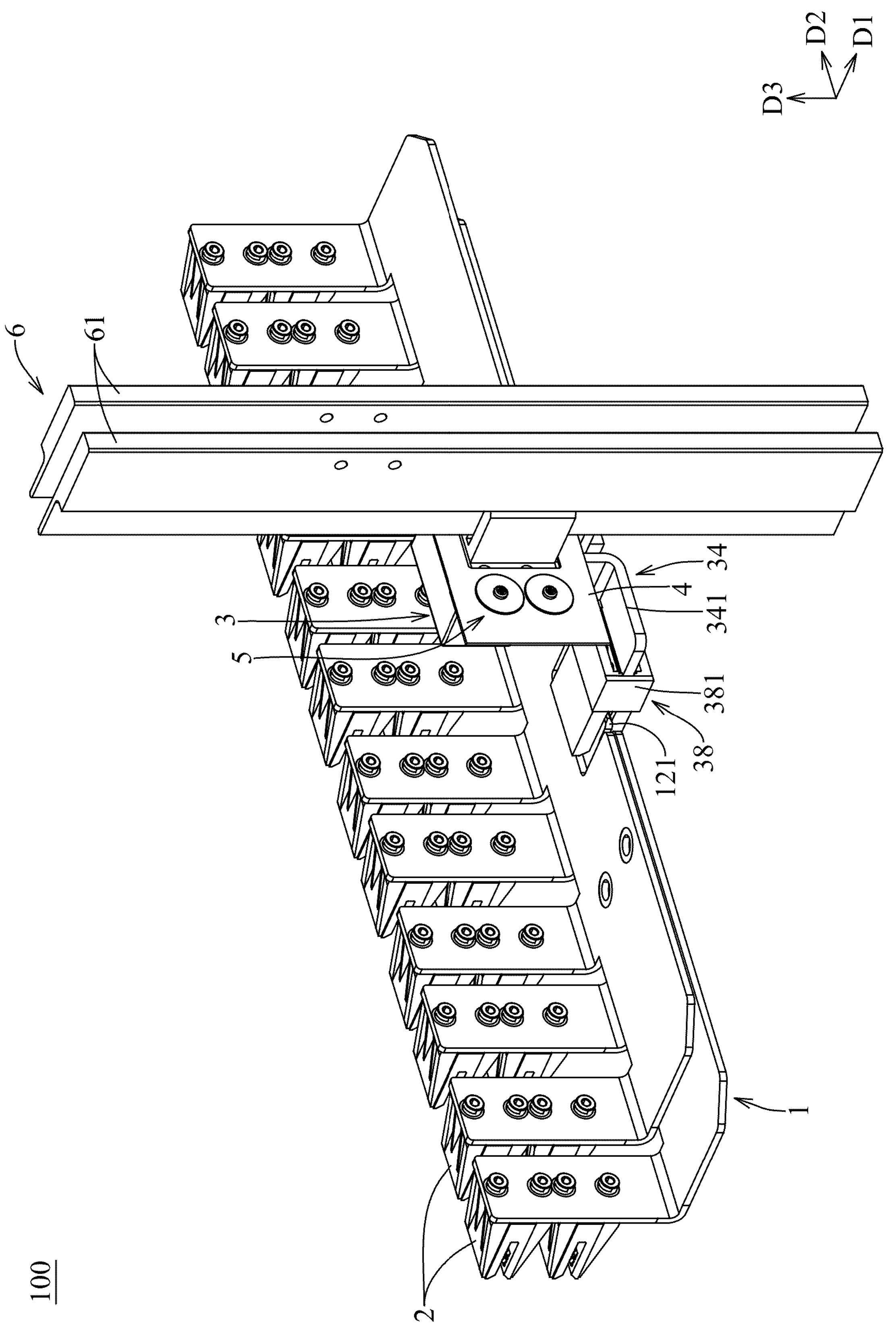
FIG. 10 is a perspective view of a second embodiment of the electrical connection device of the present disclosure.

Referring to FIG. 10, a second embodiment of the electrical connection device 100 of the present disclosure is substantially the same as the first embodiment in entire structure and difference lies in the busbar group 1 and the adapter 3.

Figure 11:
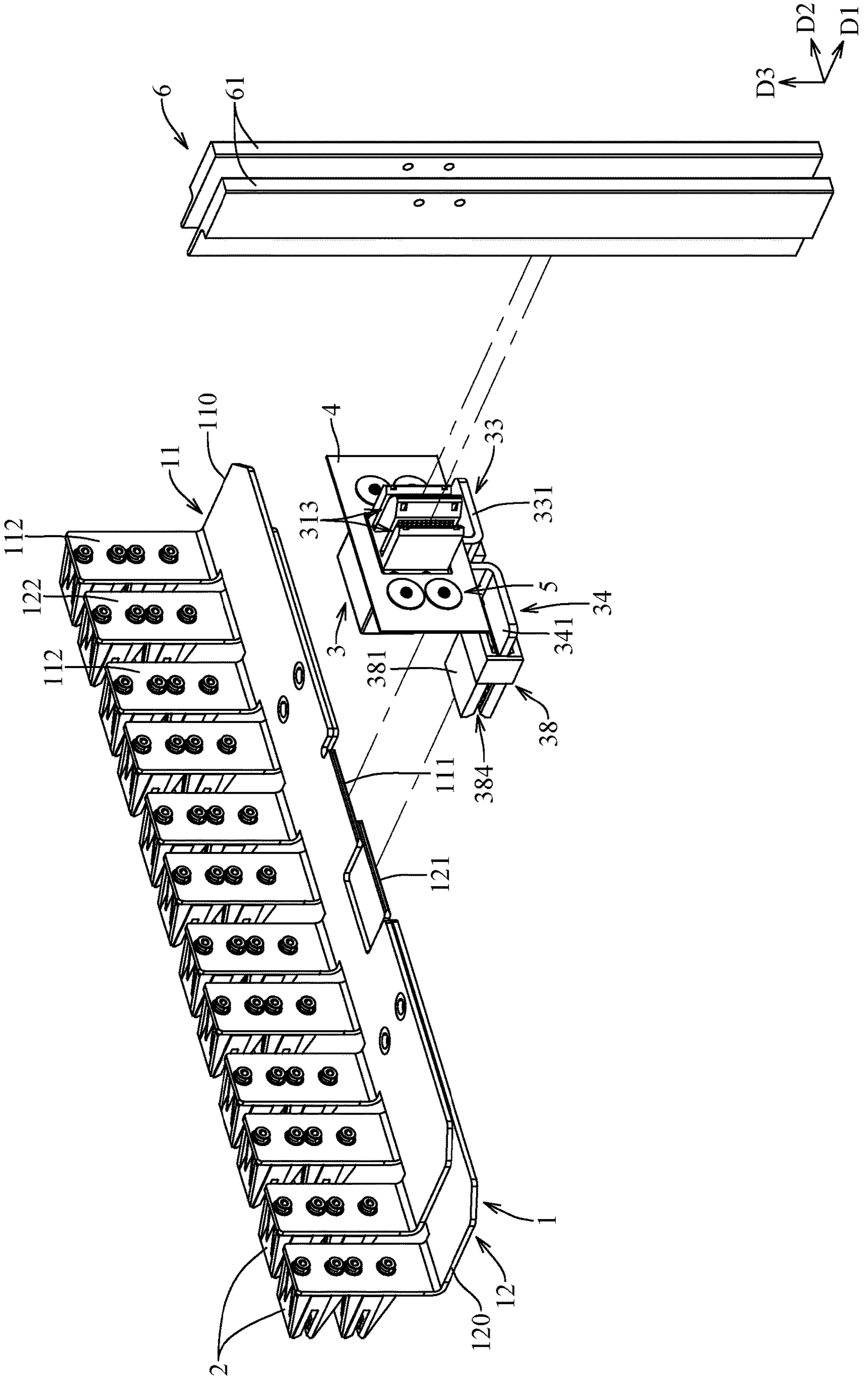
FIG. 11 is a perspective exploded view of the second embodiment.
Figure 12:
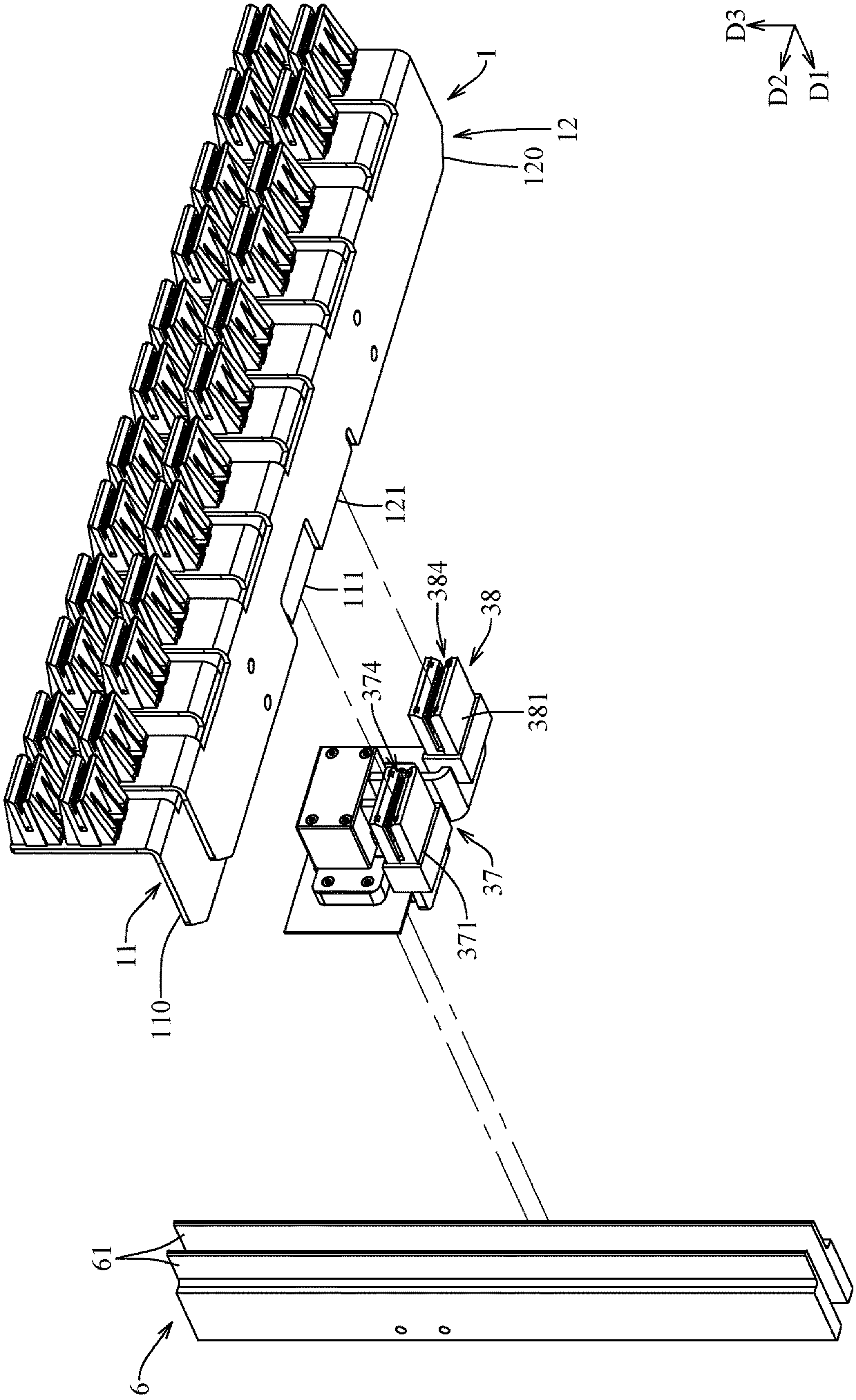
FIG. 12 is a perspective exploded view of the second embodiment viewed from another angle.
Figure 13:
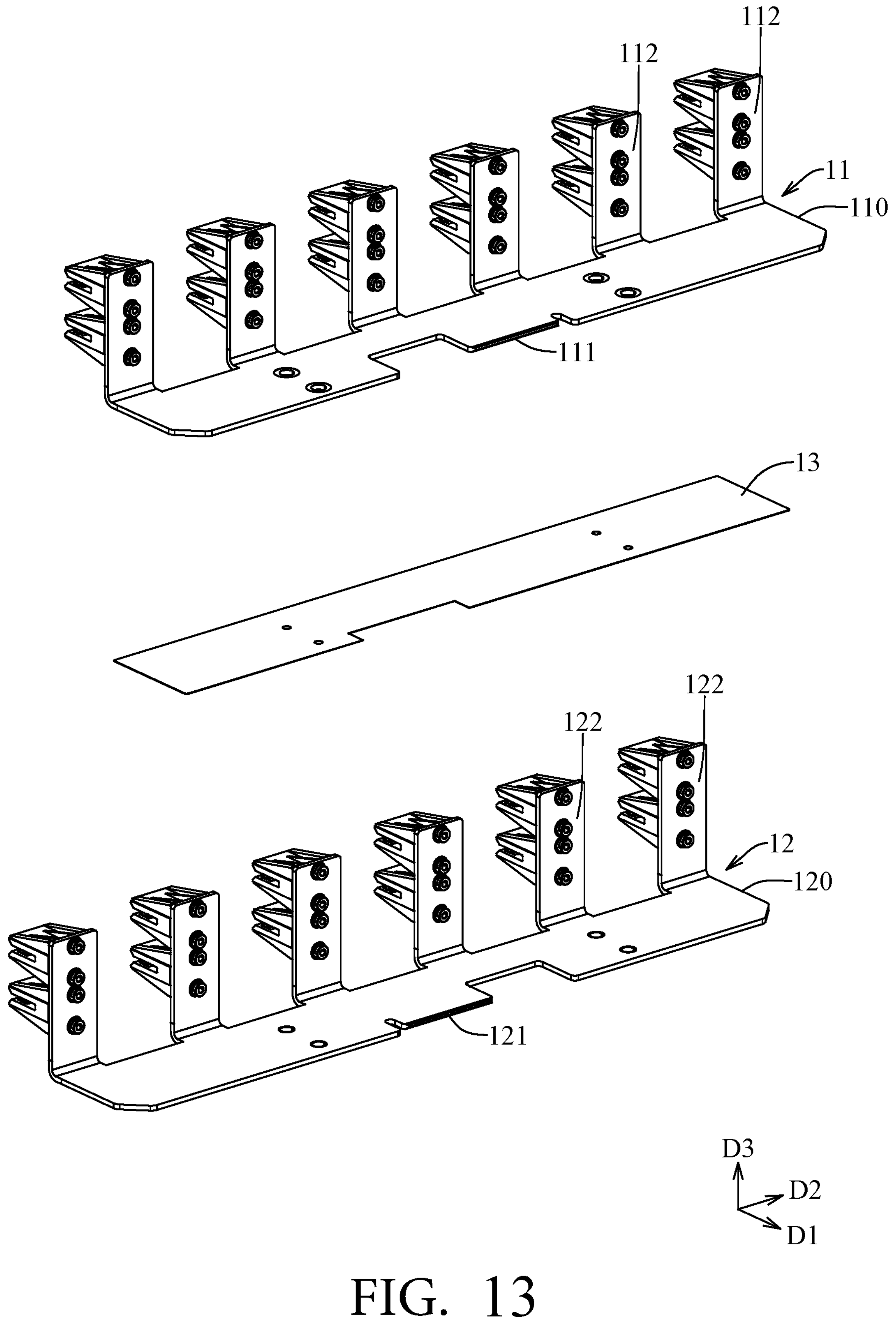
FIG. 13 is a perspective exploded view of the busbar group of the second embodiment.

Referring to FIG. 11, FIG. 12 and FIG. 13, the first transmitting portion 111 of the first busbar 11 is a front plate edge of the first body 110. The second transmitting portion 121 of the second busbar 12 is a front plate edge of the second body 120.

Figure 14:
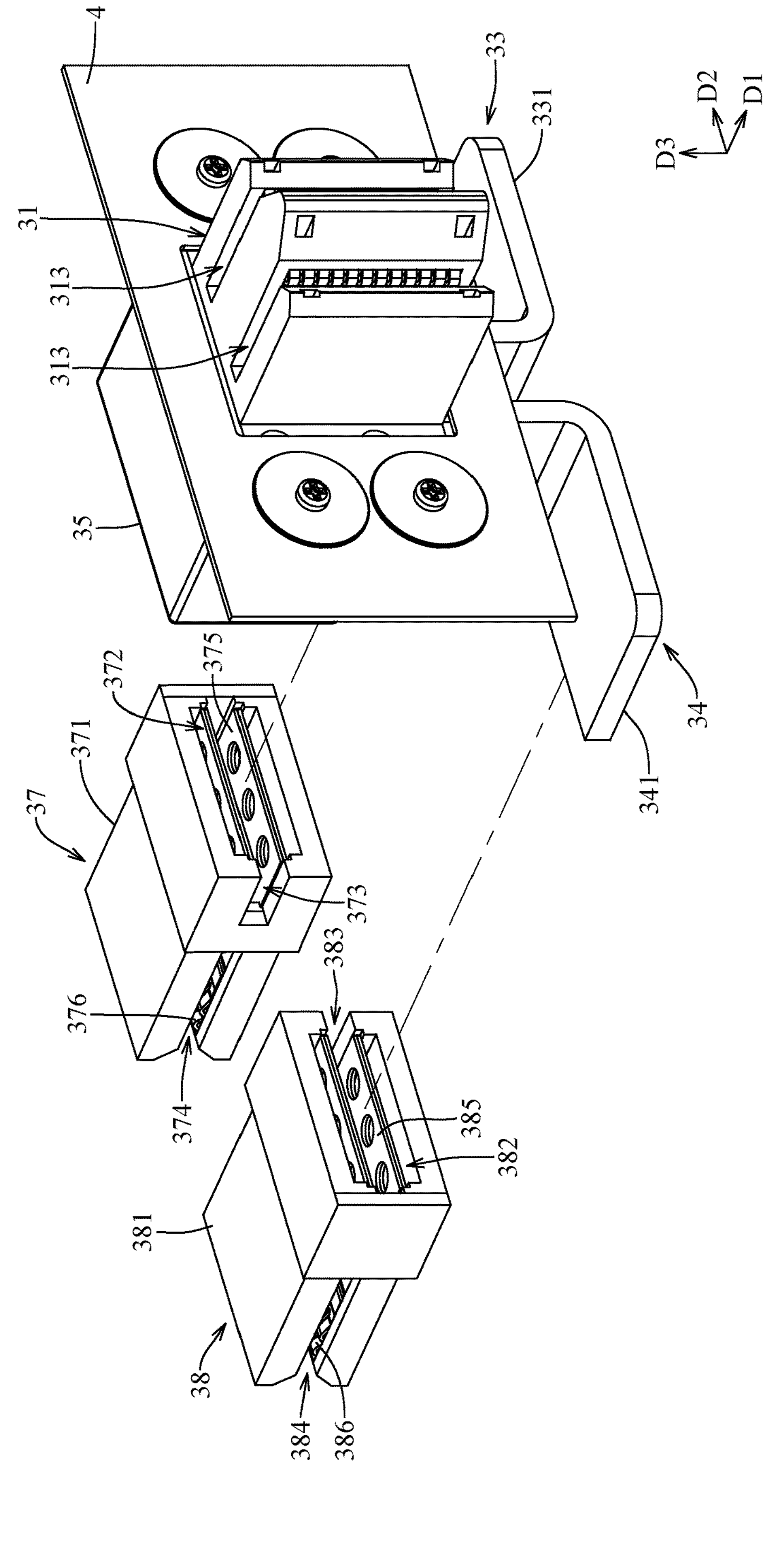
FIG. 14 is a partial perspective exploded view of the second embodiment.
Figure 15:
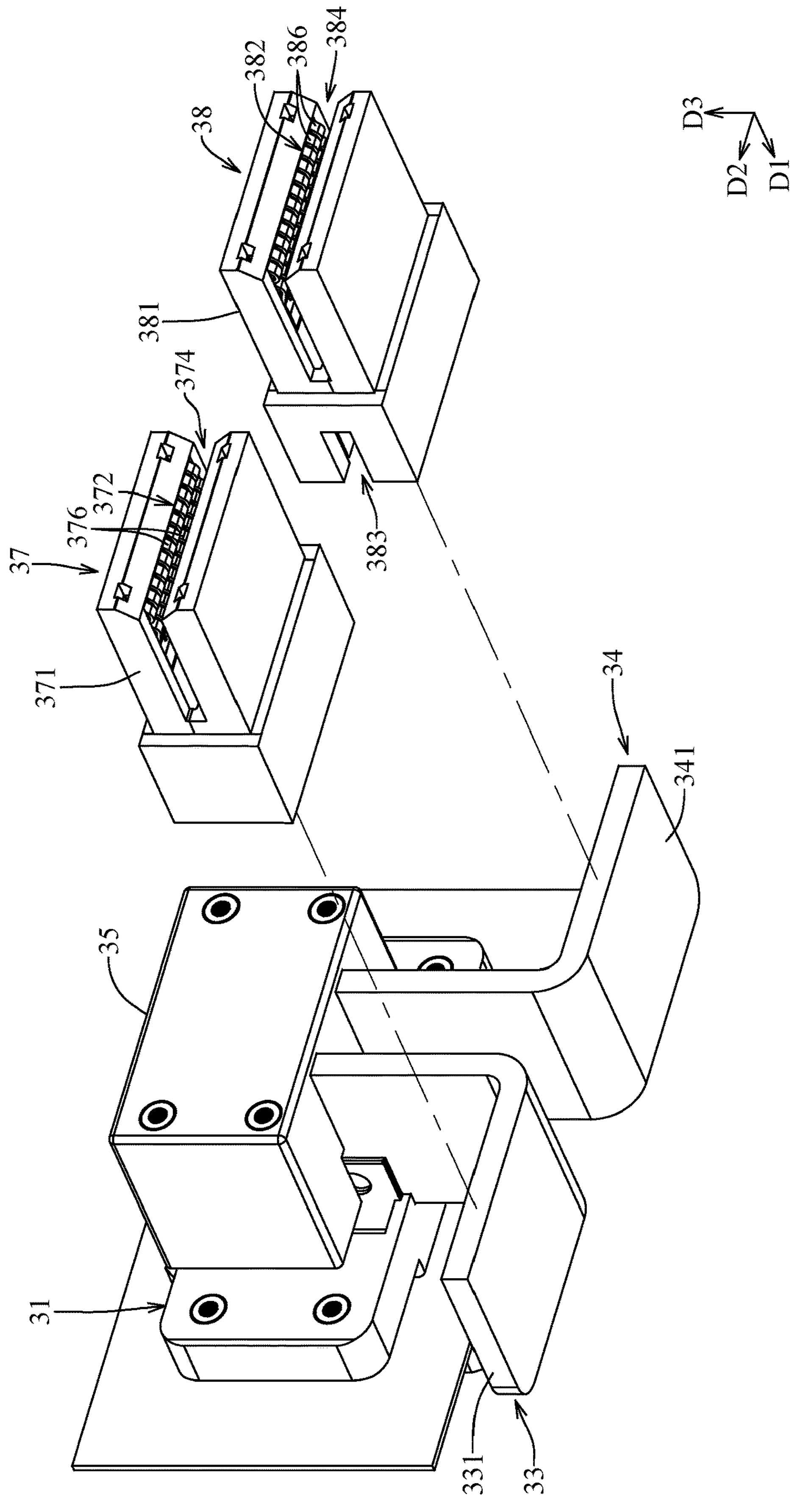
FIG. 15 is a partial perspective exploded view of the second embodiment viewed from another angle.

Referring to FIG. 12, FIG. 14 and FIG. 15, the adapter 3 further includes a first straddle type connector 37 and a second straddle type connector 38. The first straddle type connector 37 and the second straddle type connector 38 are respectively fixed to the first flat plate body 331 of the first adapting plate 33 and the second flat plate body 341 of the second adapting plate 34. The first straddle type connector 37 includes a first insulative housing 371 and a first power terminal 372 provided to the first insulative housing 371. The first insulative housing 371 is formed with a first snapping groove 373 whose right end is in form of opened shape and a first mating groove 374 whose left end and right end are in form of opened shape. The first snapping groove 373 is toward the front and allows the first flat plate body 331 to snap therein. An opening of the first mating groove 374 is toward the rear, the first mating groove 374 is used to allow the first transmitting portion 111 to insert therein. The first power terminal 372 has a first connecting portion 375 and a plurality of first contacting portions 376. The first connecting portion 375 is provided in the first snapping groove 373 and is connected to the first flat plate body 331. The plurality of first contacting portions 376 are connected to a rear end of the first connecting portion 375, are arranged along the left-right direction D2, are provided in the first mating groove 374 and extend toward the opening of the first mating groove 374.

The second straddle type connector 38 includes a second insulative housing 381 and a second power terminal 382 provided to the second insulative housing 381. The second insulative housing 381 is formed with a second snapping groove 383 whose left end is in form of opened shape and a second mating groove 384 whose left end and right end are in form of opened shape. The second snapping groove 383 is toward the front and allows the second flat plate body 341 to snap therein. An opening of the second mating groove 384 is toward the rear, the second mating groove 384 is used to allow the second transmitting portion 121 to insert therein. The second power terminal 382 has a second connecting portion 385 and a plurality of second contacting portions 386. The second connecting portion 385 is provided in the second snapping groove 383 and is connected to the second flat plate body 341. The plurality of second contacting portions 386 are connected to a rear end of the second connecting portion 385, are arranged along the left-right direction D2, are provided in the second mating groove 384 and extend toward the opening of the second mating groove 384.

The first transmitting portion 111 of the first busbar 11 and the second transmitting portion 121 of the second busbar 12 respectively insert into the first mating groove 374 and the second mating groove 384 and are configured so that the first transmitting portion 111 and the second transmitting portion 121 are capable of floating respectively relative to the first mating groove 374 and the second mating groove 384 along the left-right direction D2. When the first transmitting portion 111 and the second transmitting portion 121 respectively insert into the first mating groove 374 and the second mating groove 384, the first transmitting portion 111 and the second transmitting portion 121 respectively contact and electrically connect with the plurality of first contacting portions 376 of the first power terminal 372 and the plurality of second contacting portions 386 of the second power terminal 382.

Figure 16:
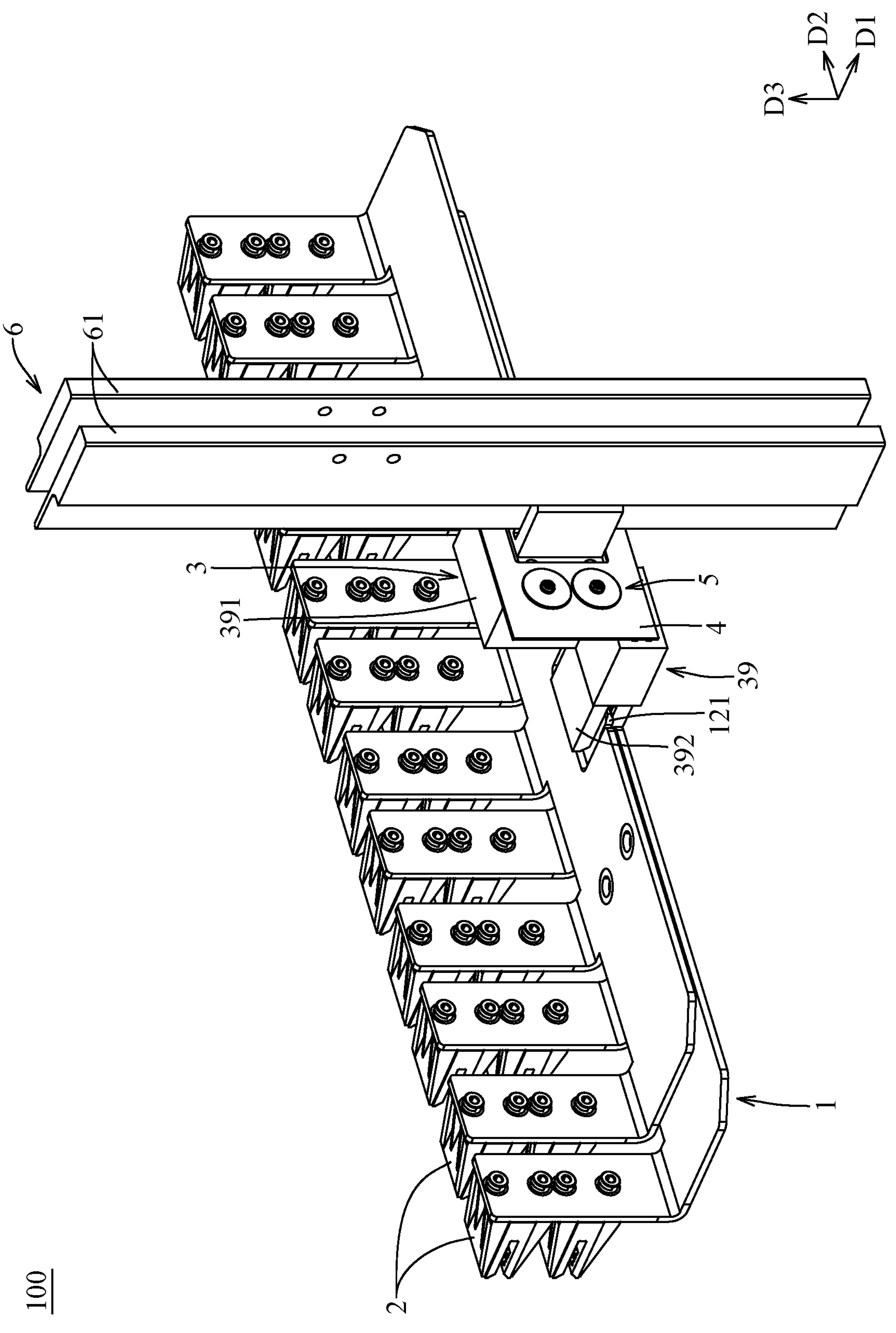
FIG. 16 is a perspective view of a third embodiment of the electrical connection device of the present disclosure.
Figure 17:
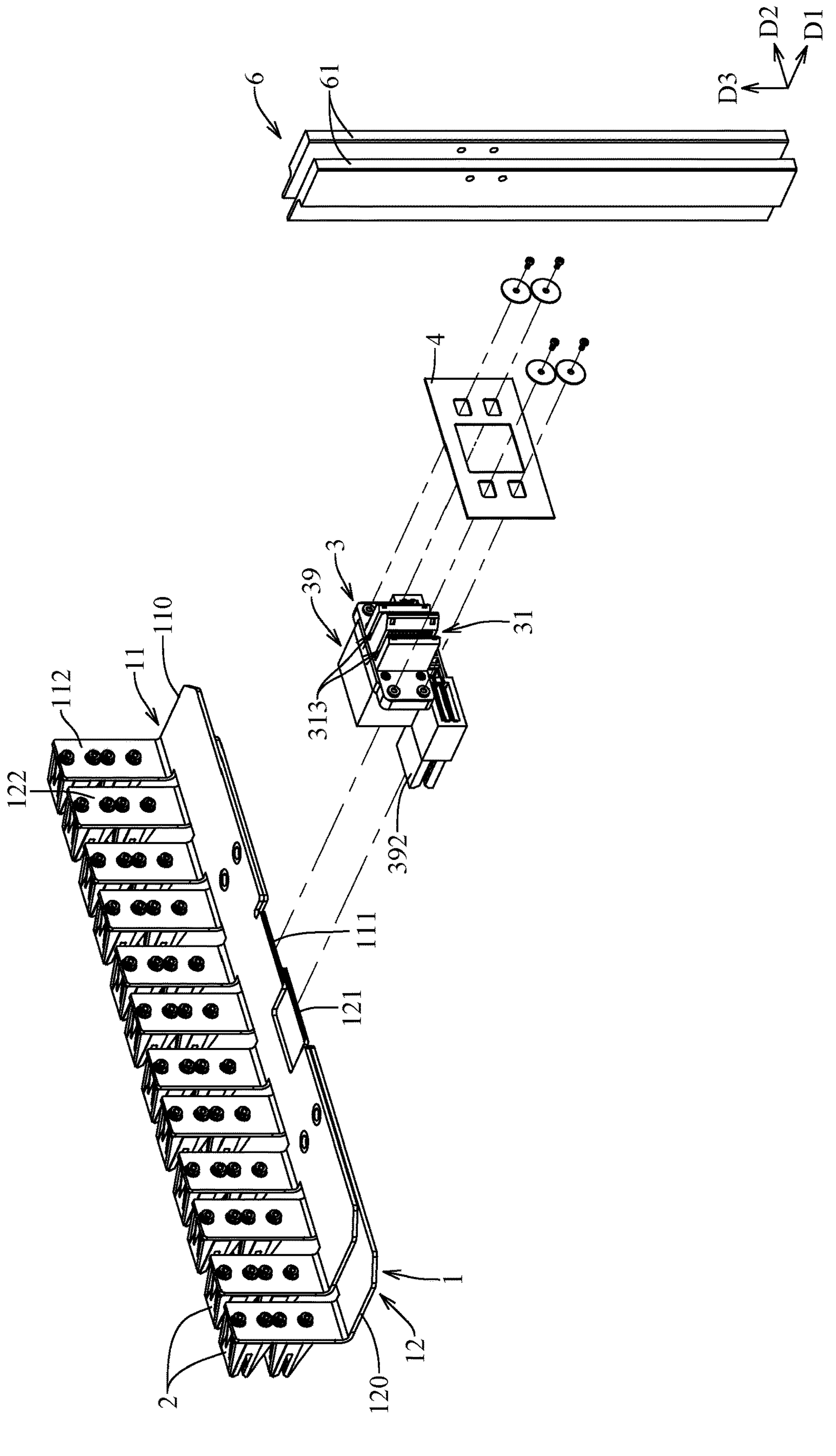
FIG. 17 is a perspective exploded view of the third embodiment.
Figure 18:
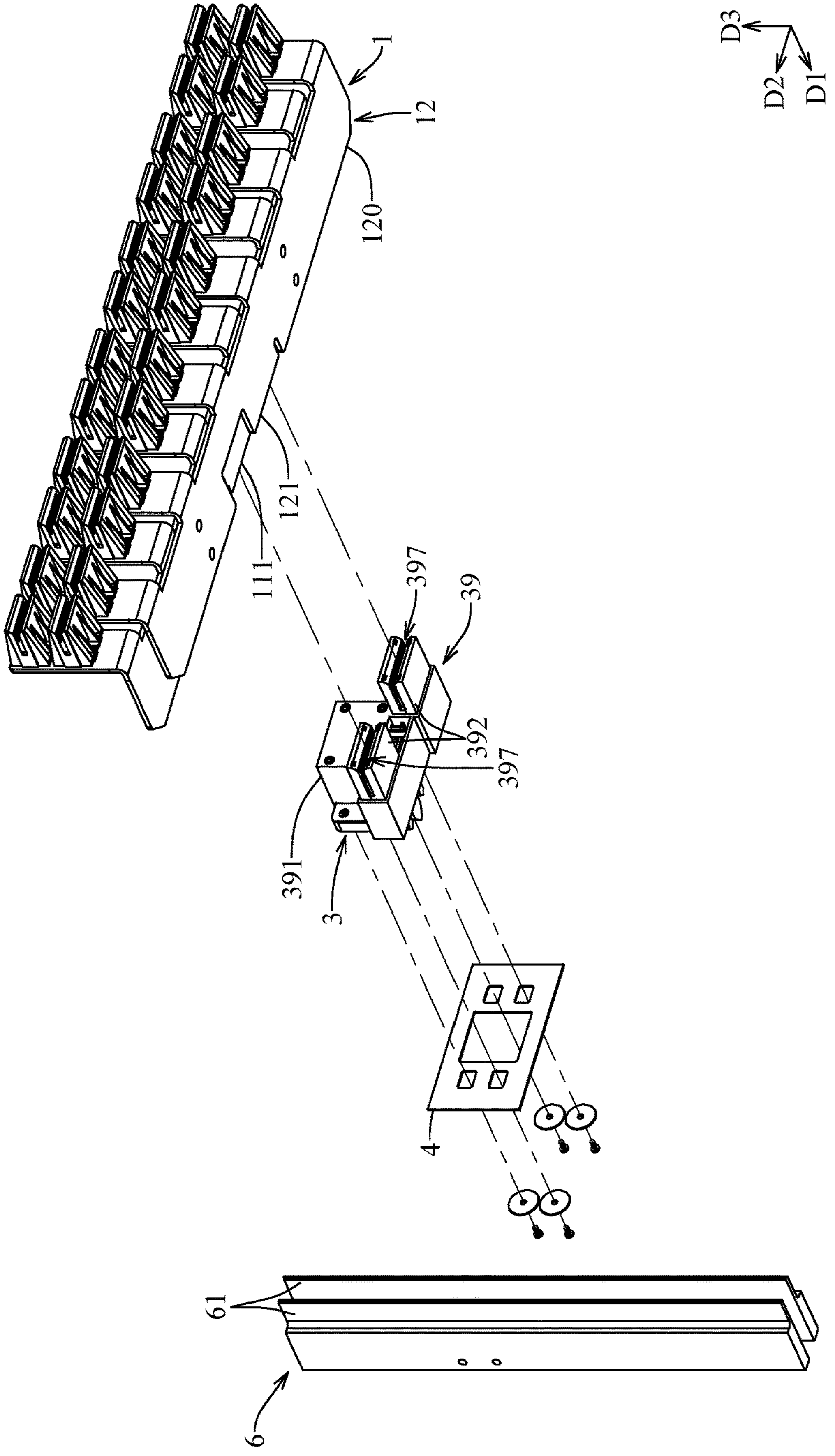
FIG. 18 is a perspective exploded view of the third embodiment viewed from another angle.
Figure 19:
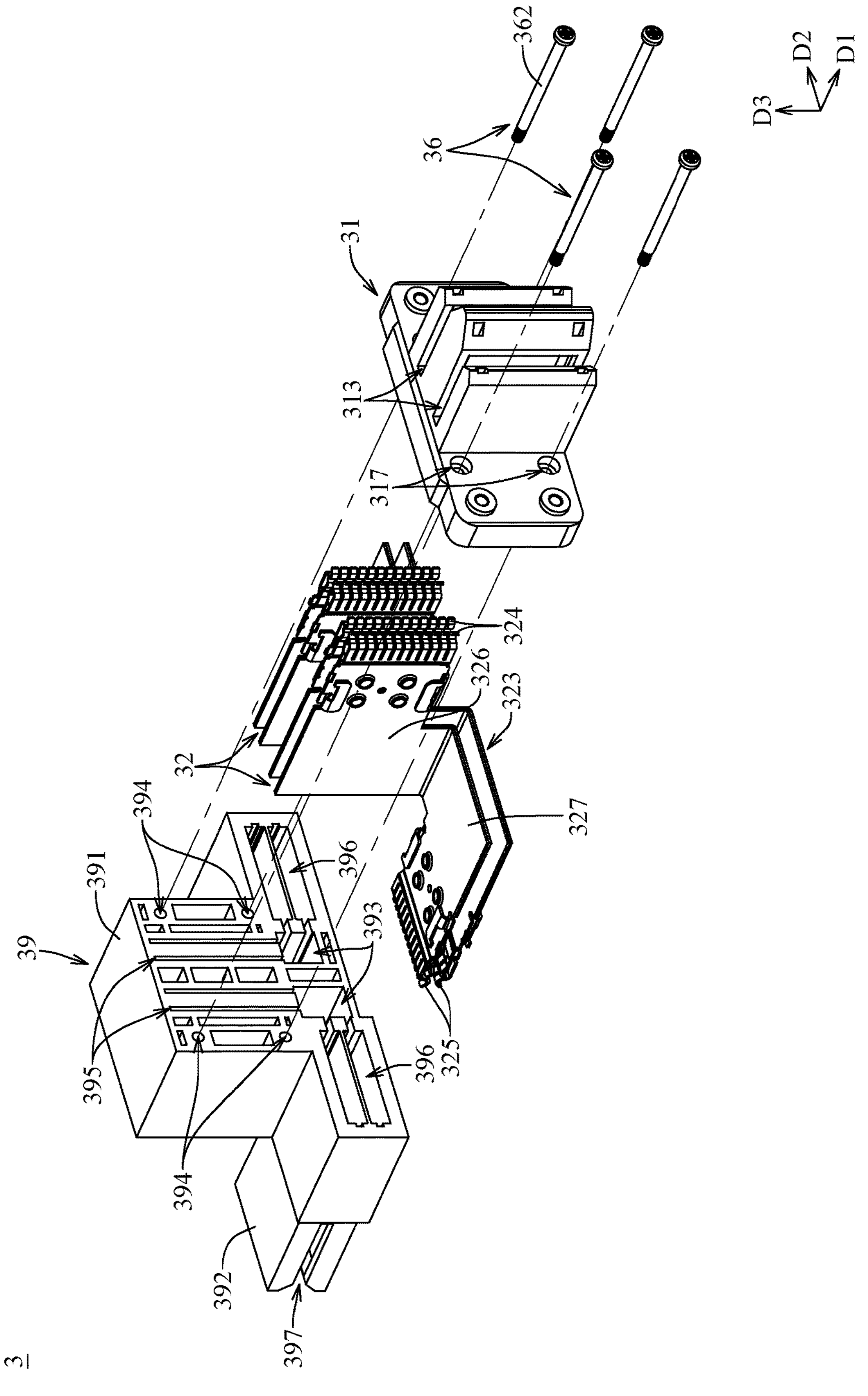
FIG. 19 is a perspective exploded view of the adapter of the third embodiment.
Figure 20:
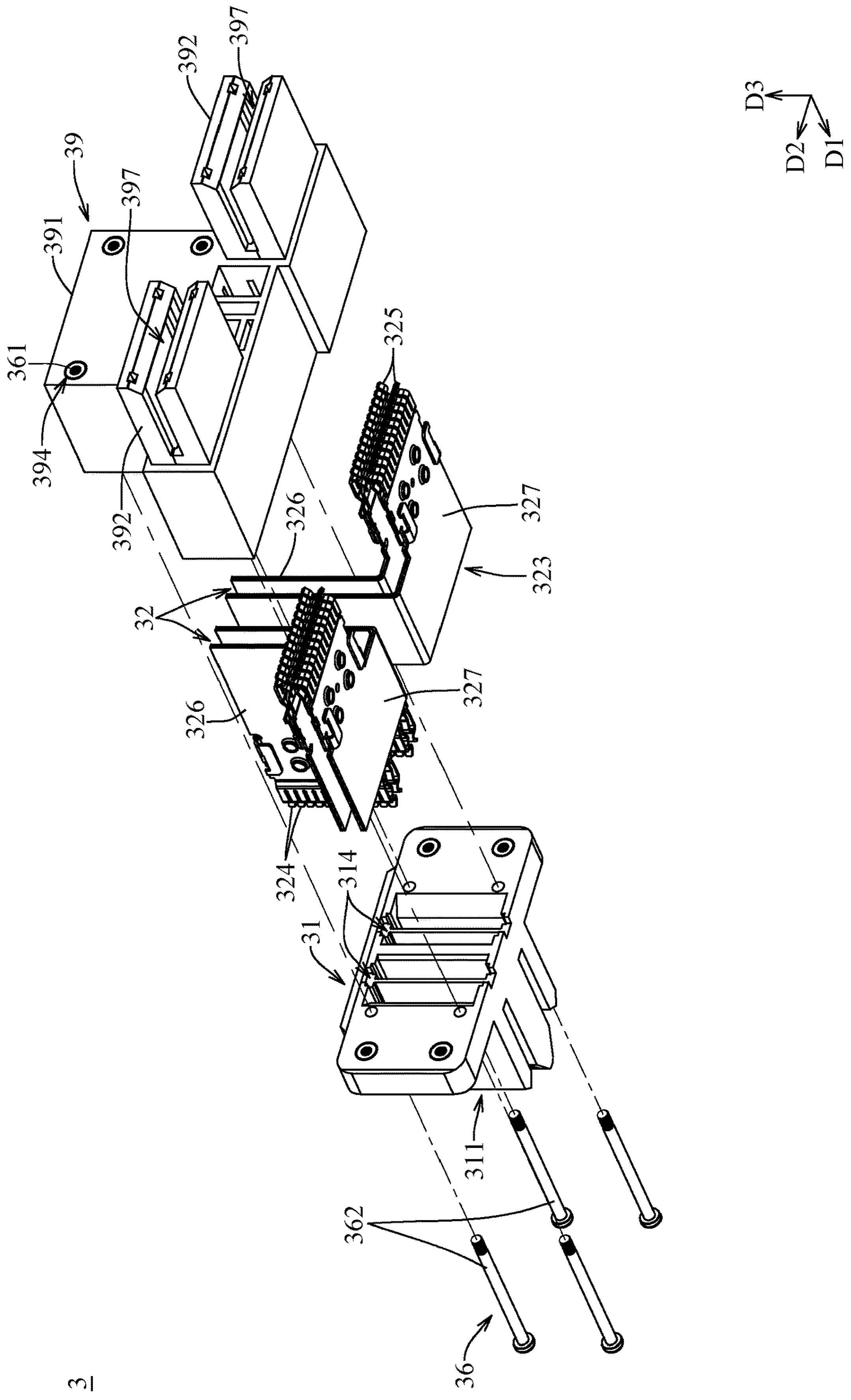
FIG. 20 is a perspective exploded view of the adapter of the third embodiment viewed from another angle.

Referring to FIG. 16, a third embodiment of the electrical connection device 100 of the present disclosure is substantially the same as the first and second embodiments in entire structure. The busbar group 1 is substantially the same as the second embodiment in structure, difference lies in the adapter 3.

Referring to FIG. 17, FIG. 18, FIG. 19 and FIG. 20, the adapter 3 further includes a strengthening cover 39. The strengthening cover 39 is a single-piece component which is made by an integrally forming manner, the integrally forming manner for example is but is not limited to injection molding. The strengthening cover 39 has a main cover body

391 and two mating housings 392. The main cover body 391 abuts against a rear end of the insulative housing 31. The main cover body 391 is formed with two retaining grooves 393 and a plurality of through holes 394. The two retaining grooves 393 are spaced apart from each other along the left-right direction D2. Each retaining groove 393 has a vertical groove portion 395 which extends along the up-down direction D3 and a flat groove portion 396 which extends along the left-right direction D2 and is communicated to a bottom end of the vertical groove portion 395. The plurality of through holes 394 respectively correspond to the first penetrating holes 317 of the insulative housing 31. The two mating housings 392 integrally extend rearwardly from a rear end of the main cover body 391 and are spaced apart from each other along the left-right direction D2. Each mating housing 392 is formed with a mating groove 397 which is communicated to the corresponding flat groove portion 396. An opening of the mating groove 397 is toward the rear. The mating grooves 397 of the two mating housings 392 are respectively used to allow the first transmitting portion 111 and the second transmitting portion 121 to insert therein.

The nut 361 of each fastening assembly 36 is provided in the corresponding through hole 394 of the strengthening cover 39. The bolt 362 is provided to the corresponding first penetrating hole 317 of the insulative housing 31 and the corresponding through hole 394 of the strengthening cover 39 and is screwed to the nut 361, so that the fastening assembly 36 locks the insulative housing 31 and the strengthening cover 39 together.

Each power terminal 32 is a double-layer type plate-shaped structure. Each power terminal 32 has a connecting portion 323 and a plurality of first contacting portions 324 and a plurality of second contacting portions 325 which are respectively connected to a front end and a rear end of the connecting portion 323. The connecting portion 323 is received in the corresponding retaining groove 393 of the main cover body 391 and has a vertical plate segment 326 and a flat plate segment 327 which is connected to a bottom end of the vertical plate segment 326. The vertical plate segment 326 is provided in the corresponding mounting groove 314, the corresponding inserting groove 313 and the vertical groove portion 395 of the corresponding retaining groove 393. The vertical plate segment 326 is retained by the vertical groove portion 395. The flat plate segment 327 is provided in the flat groove portion 396 of the corresponding retaining groove 393 and is retained by the flat groove portion 396. The plurality of first contacting portions 324 are connected to a front end of the vertical plate segment 326, are arranged along the up-down direction D3, are provided in the corresponding inserting groove 313 and extend toward the opening of the corresponding inserting groove 313. The plurality of second contacting portions 325 are connected to a rear end of the flat plate segment 327, are arranged along the left-right direction D2, are provided in the corresponding mating groove 397 and extend toward the opening of the corresponding mating groove 397.

By that, the two retaining grooves 393 respectively retain the connecting portions 323 of the power terminals 32, the strengthening cover 39 can function as supporting the connecting portions 323, so that structural strength among the power terminals 32 can be strengthened.

The first transmitting portion 111 and the second transmitting portion 121 respectively insert into the two mating grooves 397 of the strengthening cover 39 of the adapter 3 and are configured so that the first transmitting portion 111 and the second transmitting portion 121 are capable of floating respectively relative to the two mating grooves 397 along the left-right direction D2. When the first transmitting portion 111 and the second transmitting portion 121 respectively insert into the two mating grooves 397, the first transmitting portion 111 and the second transmitting portion 121 respectively contact and electrically connect with the second contacting portions 325 of the power terminals 32. When the two rack busbars 61 respectively insert into the two inserting grooves 313, the two rack busbars 61 respectively contact and electrically connect with the first contacting portions 324 of the power terminals 32.

By the design of the power terminals 32 and the strengthening cover 39, the number of the constituent components of the adapter 3 of the third embodiment is reduced in comparison with the number of the constituent component of the adapter 3 of the first and second embodiments, so that assembling complexity can be lowered and manufacturing cost can be saved.

In conclusion, in the electrical connection device 100 of each embodiment, by that the adapter 3 is connected between the busbar group 1 and the rack busbar group 6, an assembling operation and a detaching operation of the rack busbar group 6 and the busbar group 1 can be rapidly and conveniently performed, so that convenience of subsequent maintenance of the rack busbar group 6 and the busbar group 1 can be promoted. By that the adapter 3 is capable of floating relative to the busbar group 1 along the left-right direction D2 and the adapter 3 is capable of floating relative to the two rack busbars 61 along the up-down direction D3, smoothness in the mating process of the busbar group 1, the adapter 3 and the rack busbar group 6 can be promoted and stability and reliability can be promoted after the busbar group 1, the adapter 3 and the rack busbar group 6 are mated with each other, so the object of the present disclosure can be achieved indeed.

However, the above description is only for the embodiments of the present disclosure, and it is not intended to limit the implementing scope of the present disclosure, and the simple equivalent changes and modifications made according to the claims and the contents of the specification are still included in the scope of the present disclosure.

What is claimed is:

1. An electrical connection device, comprising:

a busbar group comprising a first busbar and a second busbar, the first busbar having a first body and a first transmitting portion provided to one side of the first body, the second busbar having a second body and a second transmitting portion provided to one side of the second body, the second body and the first body being constructed therebetween to be insulated from each other and be not conducted with each other;

a rack busbar group comprising two rack busbars; and an adapter pluggably mating with the first transmitting portion and the second transmitting portion of the busbar group and configured so that the adapter is capable of floating relative to the busbar group along a left-right direction, the adapter further pluggably mating with the two rack busbars of the rack busbar group and being configured so that the adapter is capable of floating relative to the rack busbar group along an up-down direction.

2. The electrical connection device of claim 1, wherein the first transmitting portion is formed with a first mating groove whose left end and right end are in form of opened shape, the second transmitting portion is formed with a second mating groove whose left end and right end are in form of opened shape;

the adapter pluggably inserts into the first mating groove and the second mating groove, the adapter is formed with two inserting grooves, an upper end and a lower end of each inserting groove are in form of opened shape;

the two rack busbars pluggably insert into the two inserting grooves, respectively.

3. The electrical connection device of claim 1, wherein the first transmitting portion comprises a first base plate and at least one first straddle type connector, the first base plate extends upwardly from the one side of the first body, the first straddle type connector is fixed to the first base plate and comprises a first insulative housing and a plurality of first power terminals provided to the first insulative housing, the first insulative housing is formed with a first mating groove whose left end and right end are in form of opened shape;

the second transmitting portion comprises a second base plate and at least one second straddle type connector, the second base plate extends upwardly from the one side of the second body, the second straddle type connector is fixed to the second base plate and comprises a second insulative housing and a plurality of second power terminals provided to the second insulative housing, the second insulative housing is formed with a second mating groove whose left end and right end are in form of opened shape;

the adapter comprises an insulative housing which allows the two rack busbars to pluggably insert therein and a first adapting plate and a second adapting plate which pluggably insert into the first mating groove and the second mating groove respectively;

when the first adapting plate and the second adapting plate respectively insert into the first mating groove and the second mating groove, the first adapting plate and the second adapting plate respectively contact and electrically connect with the plurality of the first power terminals and the plurality of the second power terminals.

4. The electrical connection device of claim 3, wherein the first transmitting portion comprises a plurality of first straddle type connectors which are fixed to the first base plate and are arranged along the left-right direction;

the second transmitting portion comprises a plurality of second straddle type connectors which are fixed to the second base plate and are arranged along the left-right direction.

5. The electrical connection device of claim 1, wherein the adapter comprises an insulative housing, two groups of power terminals, a first adapting plate and a second adapting plate, the insulative housing is formed with two inserting grooves which respectively allow the two rack busbars to insert therein, an upper end and a lower end of each inserting groove are in form of opened shape, the first adapting plate and the second adapting plate are pluggably insert into the first transmitting portion and the second transmitting portion respectively, the power terminals are respectively provided to the two inserting grooves, each power terminal has a plurality of contacting portions which extend toward an opening of the corresponding inserting groove and a connecting portion, the connecting portions of the power terminals are respectively connected to the first adapting plate and the second adapting plate, when the two rack busbars respectively insert into the two inserting grooves of the adapter, the two rack busbars respectively contact and electrically connect with the connecting portions of the power terminals.

6. The electrical connection device of claim 1, wherein the first transmitting portion is formed with a first mating groove whose left end and right end are in form of opened shape, the second transmitting portion is formed with a second mating groove whose left end and right end are in form of opened shape, the adapter comprises an insulative housing, two groups of power terminals, a first adapting plate and a second adapting plate, the insulative housing is formed with two inserting grooves, an upper end and a lower end of each inserting groove are in form of opened shape, the power terminals are respectively provided to the two inserting grooves of the insulative housing, the first adapting plate and the second adapting plate are respectively connected to the power terminals, the first adapting plate and the second adapting plate pluggably insert into the first mating groove and the second mating groove respectively, the two rack busbars pluggably insert into the two inserting grooves, respectively.

7. The electrical connection device of claim 6, wherein the first adapting plate has a first flat plate body which inserts into the first mating groove and a first vertical plate body which extends from a side of the first flat plate body and is connected to the corresponding power terminal, the second adapting plate has a second flat plate body which inserts into the second mating groove and a second vertical plate body which extends from a side of the second flat plate body and is connected to the corresponding power terminal, the power terminals respectively contact and electrically connect with the two rack busbars.

8. The electrical connection device of claim 1, wherein the first transmitting portion is a plate edge of the first body, the second transmitting portion is a plate edge of the second body, the adapter is formed with two mating grooves and two inserting grooves, a left end and a right end of each mating groove are in form of opened shape, an upper end and a lower end of each inserting groove are in form of opened shape, the first transmitting portion and the second transmitting portion pluggably insert into the two mating grooves respectively, the two rack busbars pluggably insert into the two inserting grooves, respectively.

9. The electrical connection device of claim 1, wherein the first transmitting portion is a plate edge of the first body, the second transmitting portion is a plate edge of the second body, the adapter comprises an insulative housing, a first straddle type connector and a second straddle type connector, the insulative housing allows the two rack busbars to pluggably insert therein, the first straddle type connector comprises a first insulative housing, and a first power terminal provided to the first insulative housing, the first insulative housing is formed with a first mating groove whose left end and right end are in form of opened shape, the second straddle type connector comprises a second insulative housing and a second power terminal provided to the second insulative housing, the second insulative housing is formed with a second mating groove whose left end and right end are in form of opened shape, when the first transmitting portion and the second transmitting portion respectively insert into the first mating groove and the second mating groove, the first transmitting portion and the second transmitting portion respectively contact and electrically connect with the first power terminal and the second power terminal.

10. The electrical connection device of claim 1, wherein the adapter comprises an insulative housing, two groups of power terminals, a first adapting plate, a second adapting plate, a first straddle type connector and a second straddle type connector, the insulative housing is formed with two inserting grooves, an upper end and a lower end of each inserting groove are in form of opened shape, the power terminals respectively are provided to the two inserting grooves, the first adapting plate and the second adapting plate are respectively connected to the power terminals, the first straddle type connector and the second straddle type connector are respectively fixed to the first adapting plate and the second adapting plate, the first transmitting portion and the second transmitting portion pluggably insert into the first straddle type connector and the second straddle type connector respectively, each power terminal has a plurality of contacting portions which extend toward an opening of the corresponding inserting groove and a connecting portion, the connecting portions of the power terminals are respectively connected to the first adapting plate and the second adapting plate, when the two rack busbars respectively insert into the two inserting grooves of the adapter, the two rack busbars respectively contact and electrically connect with the connecting portions of the power terminals.

11. The electrical connection device of claim 1, wherein the first transmitting portion is a plate edge of the first body, the second transmitting portion is a plate edge of the second body, the adapter comprises an insulative housing, two groups of power terminals, a first adapting plate, a second adapting plate, a first straddle type connector and a second straddle type connector, the insulative housing is formed with two inserting grooves, an upper end and a lower end of each inserting groove are in form of opened shape, the power terminals are respectively provided to the two inserting grooves, the first adapting plate and the second adapting plate are respectively connected to the power terminals, the first straddle type connector and the second straddle type connector are respectively fixed to the first adapting plate and the second adapting plate, the first straddle type connector comprises a first insulative housing and a first power terminal provided to the first insulative housing, the first insulative housing is formed with a first mating groove whose left end and right end are in form of opened shape, the second straddle type connector comprises a second insulative housing and a second power terminal provided to the second insulative housing, the second insulative housing is formed with a second mating groove whose left end and right end are in form of opened shape, the first transmitting portion and the second transmitting portion pluggably insert into the first mating groove and the second mating groove respectively, the two rack busbars pluggably insert into the two inserting grooves, respectively.

12. The electrical connection device of claim 11, wherein the first adapting plate has a first flat plate body which is fixed to the first straddle type connector and a first vertical plate body which extends from a side of the first flat plate body and is connected to the corresponding power terminal, the second adapting plate has a second flat plate body which is fixed to the second straddle type connector and a second vertical plate body which extends from a side of the second flat plate body and is connected to the corresponding power terminal.

13. The electrical connection device of claim 7, wherein the adapter comprises a strengthening cover, the strengthening cover is formed with a first retaining groove which allows the first vertical plate body to be received therein and retains the first vertical plate body and a second retaining groove which allows the second vertical plate body to be received therein and retains the second vertical plate body.

14. The electrical connection device of claim 1, wherein the first transmitting portion is a plate edge of the first body, the second transmitting portion is a plate edge of the second body, the adapter comprises an insulative housing, a strengthening cover and two groups of power terminals, the insulative housing allows the two rack busbars to pluggably insert therein, the strengthening cover is provided to the insulative housing and is formed with two mating grooves, a left end and a right end of each mating groove are in form of opened shape, the power terminals are respectively provided to the two mating grooves, when the first transmitting portion and the second transmitting portion respectively insert into the two mating grooves, the first transmitting portion and the second transmitting portion respectively contact and electrically connect with the power terminals.

15. The electrical connection device of claim 1, wherein the adapter comprises an insulative housing, a strengthening cover and two groups of power terminals, the insulative housing is formed with two inserting grooves, an upper end and a lower end of each inserting groove are in form of opened shape, the strengthening cover is provided to the insulative housing and pluggably inserts into the first transmitting portion and the second transmitting portion, the power terminals are respectively provided to the two inserting grooves, when the two rack busbars respectively insert into the two inserting grooves, the two rack busbars respectively contact and electrically connect with the power terminals.

16. The electrical connection device of claim 1, wherein the first transmitting portion is a plate edge of the first body, the second transmitting portion is a plate edge of the second body, the adapter comprises an insulative housing, a strengthening cover and two groups of power terminals, the insulative housing is formed with two inserting grooves, an upper end and a lower end of each inserting groove are in form of opened shape, the strengthening cover is provided to the insulative housing and is formed with two mating grooves, a left end and a right end of each mating groove are in form of opened shape, each power terminal has a connecting portion which is provided to the insulative housing and the strengthening cover and a plurality of first contacting portions and a plurality of second contacting portions which are connected to opposite ends of the connecting portion, the plurality of the first contacting portions extend toward an opening of the corresponding inserting groove, the plurality of the second contacting portion extend toward an opening of the corresponding mating groove, when the first transmitting portion and the second transmitting portion respectively insert into the two mating grooves, the first transmitting portion and the second transmitting portion respectively contact and electrically connect with the second contacting portions of the power terminals, when the two rack busbars respectively insert into the two inserting grooves, the two rack busbars respectively contact and electrically connect with the first contacting portions of the power terminals.

17. The electrical connection device of claim 16, wherein the connecting portion of each power terminal has a vertical plate segment and a flat plate segment which is connected to an end of the vertical plate segment, the plurality of the first contacting portions are connected to the vertical plate segment, the plurality of the second contacting portions are connected to the flat plate segment, the strengthening cover further is formed with two retaining grooves, each retaining groove has a vertical groove portion and a flat groove portion which is communicated to an end of the vertical groove portion, the vertical groove portion allows the vertical plate segment of the corresponding power terminal to be provided therein and retains the vertical plate segment, the flat groove portion allows the flat plate segment of the corresponding power terminal to be provided therein and retains the flat plate segment.

18. The electrical connection device of claim 14, wherein the strengthening cover is a single-piece component made by an integrally forming manner.

19. The electrical connection device of claim 1, wherein the first busbar further has a plurality of first mounting portions which are provided to the other side of the first body, the second busbar further has a plurality of second mounting portions which are provided to the other side of the second body, the plurality of the first mounting portions and the plurality of the second mounting portions are alternately arranged.

20. The electrical connection device of claim 1, wherein the first busbar further has a plurality of first mounting portions which are provided to the other side of the first body, the second busbar further has a plurality of second mounting portions which are provided to the other side of the second body, the electrical connection device further comprises a plurality of connectors, the plurality of connectors are respectively mounted to the plurality of first mounting portions and the plurality of second mounting portions.

21. The electrical connection device of claim 1, further comprising a panel and a plurality of retaining assemblies, the panel being formed with a plurality of apertures, each retaining assembly being provided to the corresponding aperture and retaining the panel to the insulative housing, a circumferential edge of each aperture and the corresponding retaining assembly being spaced apart from each other, each retaining assembly being capable of floating in the corresponding aperture along the left-right direction and the up-down direction.

* * * * *